US012138755B2

(12) United States Patent
Su

(10) Patent No.: US 12,138,755 B2
(45) Date of Patent: Nov. 12, 2024

(54) ANTI-SLIP DRIVING TOOL ADAPTED TO BE USED AT AN ANGLE OFF-AXIS TO OBJECT TO BE DRIVEN

(71) Applicant: Hong Ann Tool Industries Co., Ltd., Taichung (TW)

(72) Inventor: Cheng-Wei Su, Taichung (TW)

(73) Assignee: HONG ANN TOOL INDUSTRIES CO., LTD., Taichung (TW)

(*) Notice: Subject to any disclaimer, the term of this patent is extended or adjusted under 35 U.S.C. 154(b) by 411 days.

(21) Appl. No.: 17/560,735

(22) Filed: Dec. 23, 2021

(65) Prior Publication Data

US 2022/0203508 A1 Jun. 30, 2022

Related U.S. Application Data

(63) Continuation-in-part of application No. 17/475,521, filed on Sep. 15, 2021, now abandoned.

(30) Foreign Application Priority Data

Dec. 29, 2020 (TW) ................................ 109146712

(51) Int. Cl.
*B25B 23/08* (2006.01)
*B25B 15/00* (2006.01)

(52) U.S. Cl.
CPC ............ *B25B 23/08* (2013.01); *B25B 15/001* (2013.01)

(58) Field of Classification Search
CPC ..... B25B 27/00; B25B 27/0007; B25B 27/02; B25B 27/14; B25B 27/18; B25B 15/02; B25B 15/04; B25B 15/008; B25B 23/02; B25B 23/08; B25B 23/0035; B25B 23/103; B25B 23/108; B25B 13/02; B25B 13/54; B23B 2251/248; B23B 51/08; Y10T 279/15
See application file for complete search history.

(56) References Cited

U.S. PATENT DOCUMENTS

| | | | | |
|---|---|---|---|---|
| 3,733,937 | A * | 5/1973 | Mezey | B25B 15/008 81/448 |
| 6,032,556 | A * | 3/2000 | Hu | B25B 15/008 81/436 |
| 8,984,991 | B1 * | 3/2015 | English | B25B 13/06 81/53.2 |
| 10,870,188 | B2 | 12/2020 | Sanford et al. | |

(Continued)

FOREIGN PATENT DOCUMENTS

| | | | |
|---|---|---|---|
| CN | 207824800 | * | 9/2018 |
| TW | 422161 U | | 2/2001 |

(Continued)

*Primary Examiner* — Robert J Scruggs
(74) *Attorney, Agent, or Firm* — Muncy, Geissler, Olds & Lowe, P.C.

(57) ABSTRACT

A driving tool includes a body portion, a driving portion, and a neck portion, wherein the driving portion defines a reference rotating axis, wherein distal end of the driving portion opposite to the body portion is provided with a front driving face having a first width in a radial direction of the reference rotating axis, wherein the neck portion is formed between the body portion and the driving portion and has a second width in the radial direction of the reference rotating axis, wherein the second width is less than the first width.

2 Claims, 27 Drawing Sheets

(56) References Cited

U.S. PATENT DOCUMENTS

| | | | | |
|---|---|---|---|---|
| 2005/0076749 | A1 | 4/2005 | Liu | |
| 2014/0102264 | A1* | 4/2014 | Werner | F16B 23/0007<br>81/436 |

FOREIGN PATENT DOCUMENTS

| | | | |
|---|---|---|---|
| TW | M 264060 | U | 5/2005 |
| TW | M 388993 | U | 9/2010 |
| TW | M 425744 | U | 4/2012 |
| TW | M 434657 | | 8/2012 |
| TW | M 442235 | U | 12/2012 |
| TW | M 538866 | U | 4/2017 |

* cited by examiner

ANTI-SLIP DRIVING TOOL ADAPTED TO BE USED AT AN ANGLE OFF-AXIS TO OBJECT TO BE DRIVEN

CROSS-REFERENCE

The present application is a continuation-in-part application of U.S. patent application Ser. No. 17/475,521, filed on Sep. 15, 2021, now abandoned, which claims priority of Taiwan patent application Ser. No. 109146712, filed on Dec. 29, 2020, of which the entire disclosure is incorporated herein by reference for all purposes.

BACKGROUND OF THE INVENTION

The present invention relates to an anti-slip driving tool and, more particularly, to an anti-slip driving tool which is adapted to be used at an angle off-axis to an object to be driven.

Conventional driving tools such as hexagonal wrenches and screwdrivers are commonly used hand tools, which are used to drive fasteners, such as bolts or screws. However, the fastener is based on cost considerations and is a large number of consumables, the material used in the manufacture of the fastener is softer than that of the driving tool, so that the fastener will be damaged when driven by the driving tool. Furthermore, using a driving tool whose size specification does not match the fastener to forcibly drive the fastener will also cause the fastener to be damaged. The driving hole of the damaged fastener is rounded out in the hex corners so that the driving tool can not effectively drive it due to relative slippage.

In view of the above, a need exists for a driving tool that mitigates and/or obviates the above drawbacks.

BRIEF SUMMARY OF THE INVENTION

An objective of the present invention is to provide a driving tool, which includes a body portion, a driving portion, and a neck portion. The driving portion defines a reference rotating axis. A distal end of the driving portion opposite to the neck portion is provided with a front driving face having a first width in a radial direction of the reference rotating axis. The neck portion is formed between the body portion and the driving portion and has a second width in the radial direction of the reference rotating axis. The second width is less than the first width.

In an example, the front driving face is a plane perpendicular to the reference rotating axis.

In an example, an outer periphery of the driving portion in the radial direction of the reference rotating axis is provided with a first peripheral face. An end of the driving portion opposite to the neck portion defines a reference plane and a first rear bevel face. The reference plane is perpendicular to the reference rotating axis. The front driving face is located in the reference plane. A side of the first rear bevel face is connected to the front driving face and forms a first side. An end of the first side is adjacent to the reference rotating axis, and another end of the first side opposite to the reference rotating axis is connected to the first peripheral face. The first rear bevel face is provided with a first corner not located on the first side and disposed between the reference plane and the body portion.

In an example, the first rear bevel face is connected to a first driving face extending in a direction parallel to the reference rotating axis. The first driving face is connected to the first corner. A side of the first driving face opposite to the first rear bevel face is connected to the front driving face.

In an example, the body portion has a third width in the radial direction of the reference rotating axis. The second width is less than the third width.

In an example, the outer periphery of the driving portion in the radial direction of the reference rotating axis is further provided with a second peripheral face, a third peripheral face, a fourth peripheral face, a fifth peripheral face, and a sixth peripheral face. The first peripheral face and the fourth peripheral face are respectively disposed at two opposite sides of the driving portion. The second peripheral face and the fifth peripheral face are respectively disposed at two opposite sides of the driving portion. The third peripheral face and the sixth peripheral face are respectively disposed at two opposite sides of the driving portion. The end of the driving portion opposite to the neck portion is further provided with a second rear bevel face, a third rear bevel face, a fourth rear bevel face, a fifth rear bevel face, and a sixth rear bevel face. A side of the second rear bevel face is connected to the front driving face and forms a second side. An end of the second side is adjacent to the reference rotating axis, and another end of the second side opposite to the reference rotating axis is connected to the second peripheral face. The second rear bevel face is provided with a second corner not located on the second side and disposed between the reference plane and the body portion. The second rear bevel face is connected to a second driving face extending in a direction parallel to the reference rotating axis. The second driving face is connected to the second corner. A side of the second driving face opposite to the second rear bevel face is connected to the front driving face. A side of the third rear bevel face is connected to the front driving face and forms a third side. An end of the third side is adjacent to the reference rotating axis, and another end of the third side opposite to the reference rotating axis is connected to the third peripheral face. The third rear bevel face is provided with a third corner not located on the third side and disposed between the reference plane and the body portion. The third rear bevel face is connected to a third driving face extending in a direction parallel to the reference rotating axis. The third driving face is connected to the third corner. A side of the third driving face opposite to the third rear bevel face is connected to the front driving face. A side of the fourth rear bevel face is connected to the front driving face and forms a fourth side. An end of the fourth side is adjacent to the reference rotating axis, and another end of the fourth side opposite to the reference rotating axis is connected to the fourth peripheral face. The fourth rear bevel face is provided with a fourth corner not located on the fourth side and disposed between the reference plane and the body portion. The fourth rear bevel face is connected to a fourth driving face extending in a direction parallel to the reference rotating axis. The fourth driving face is connected to the fourth corner. A side of the fourth driving face opposite to the fourth rear bevel face is connected to the front driving face. A side of the fifth rear bevel face is connected to the front driving face and forms a fifth side. An end of the fifth side is adjacent to the reference rotating axis, and another end of the fifth side opposite to the reference rotating axis is connected to the fifth peripheral face. The fifth rear bevel face is provided with a fifth corner not located on the fifth side and disposed between the reference plane and the body portion. The fifth rear bevel face is connected to a fifth driving face extending in a direction parallel to the reference rotating axis. The fifth driving face is connected to the fifth corner. A side of the fifth driving face opposite to the fifth rear bevel face is connected to the front driving face. A side of the sixth rear bevel face is connected to the front driving face and forms a sixth side. An end of the sixth side is adjacent to the reference rotating axis, and another end of the sixth side opposite to the reference rotating axis is connected to the sixth peripheral face. The sixth rear bevel face is provided with a sixth corner not located on the sixth side and disposed between the reference plane and the body portion. The sixth rear bevel face is connected to a sixth driving face extending in a direction parallel to the reference rotating axis. The sixth driving face is connected to the sixth corner. A side of the sixth driving face opposite to the sixth rear bevel face is connected to the front driving face.

In an example, a width between the first peripheral face and the fourth peripheral face in the radial direction of the reference rotating axis is tapered from an end adjacent to the front driving face to another end adjacent to the neck portion. A width between the second peripheral face and the fifth peripheral face in the radial direction of the reference rotating axis is tapered from an end adjacent to the front driving face to another end adjacent to the neck portion. A width between the third peripheral face and the sixth peripheral face in the radial direction of the reference rotating axis is tapered from an end adjacent to the front driving face to another end adjacent to the neck portion.

In an example, an outer periphery of the neck portion in the radial direction of the reference rotating axis is provided with a first neck surface, a second neck surface, a third neck surface, a fourth neck surface, a fifth neck surface, and a sixth neck surface. Each of the first, second, third, fourth, fifth and sixth neck surfaces is a concave surface. An end of the first neck surface is connected to the first peripheral face, and another end of the first neck surface is connected to the body portion. An end of the second neck surface is connected to the second peripheral face, and another end of the second neck surface is connected to the body portion. An end of the third neck surface is connected to the third peripheral face, and another end of the third neck surface is connected to the body portion. An end of the fourth neck surface is connected to the fourth peripheral face, and another end of the fourth neck surface is connected to the body portion. An end of the fifth neck surface is connected to the fifth peripheral face, and another end of the fifth neck surface is connected to the body portion. An end of the sixth neck surface is connected to the sixth peripheral face, and another end of the sixth neck surface is connected to the body portion.

In another example, the outer periphery of the driving portion in the radial direction of the reference rotating axis is further provided with a seventh peripheral face, an eighth peripheral face, a ninth peripheral face, a tenth peripheral face, an eleventh peripheral face, and a twelfth peripheral face. The seventh peripheral face is disposed between the first peripheral face and the second peripheral face and is connected to the first corner. The eighth peripheral face is disposed between the second peripheral face and the third peripheral face and is connected to the second corner. The ninth peripheral face is disposed between the third peripheral face and the fourth peripheral face and is connected to the third corner. The tenth peripheral face is disposed between the fourth peripheral face and the fifth peripheral face and is connected to the fourth corner. The seventh peripheral face and the tenth peripheral face are respectively disposed at two opposite sides of the driving portion. The eleventh peripheral face is disposed between the fifth peripheral face and the sixth peripheral face and is connected to the fifth corner. The eighth peripheral face and the eleventh peripheral face are respectively disposed at two opposite sides of the driving portion. The twelfth peripheral face is disposed between the sixth peripheral face and the first peripheral face and is connected to the sixth corner. The ninth peripheral face and the twelfth peripheral face are respectively disposed at two opposite sides of the driving portion. A width between the first peripheral face and the fourth peripheral face in the radial direction of the reference rotating axis is equal to a width between the second peripheral face and the fifth peripheral face in the radial direction of the reference rotating axis, and is equal to a width between the third peripheral face and the sixth peripheral face in the radial direction of the reference rotating axis. A width between the seventh peripheral face and the tenth peripheral face in the radial direction of the reference rotating axis is equal to a width between the eighth peripheral face and the eleventh peripheral face in the radial direction of the reference rotating axis, and is equal to a width between the ninth peripheral face and the twelfth peripheral face in the radial direction of the reference rotating axis. The width between the first peripheral face and the fourth peripheral face in the radial direction of the reference rotating axis is less than the width between the seventh peripheral face and the tenth peripheral face in the radial direction of the reference rotating axis.

In another example, an outer periphery of the neck portion in the radial direction of the reference rotating axis is provided with a first neck surface, a second neck surface, a third neck surface, a fourth neck surface, a fifth neck surface, and a sixth neck surface. Each of the first, second, third, fourth, fifth and sixth neck surfaces is a concave surface. An end of the first neck surface is connected to the seventh peripheral face, and another end of the first neck surface is connected to the body portion. An end of the second neck surface is connected to the eighth peripheral face, and another end of the second neck surface is connected to the body portion. An end of the third neck surface is connected to the ninth peripheral face, and another end of the third neck surface is connected to the body portion. An end of the fourth neck surface is connected to the tenth peripheral face, and another end of the fourth neck surface is connected to the body portion. An end of the fifth neck surface is connected to the eleventh peripheral face, and another end of the fifth neck surface is connected to the body portion. An end of the sixth neck surface is connected to the twelfth peripheral face, and another end of the sixth neck surface is connected to the body portion.

In an example, the driving portion includes an outer periphery surrounding the longitudinal axis and having a first peripheral face. An end of the driving portion opposite to the neck portion includes a first end face connected to the first peripheral face. The first end face includes a first side and a first angle located outside of the first side. The end of the driving portion opposite to the neck portion includes a reference plane perpendicular to the longitudinal axis. The first side is located on the reference plane. An end of the first side is adjacent to the longitudinal axis. Another end of the first side opposite to the longitudinal axis is connected to the first peripheral face. The first angle is located between the reference plane and the body portion.

In an example, the first end face is connected to a first driving face extending in a direction parallel to the reference rotating axis. The first driving face is connected to the first angle. The first driving face includes an angle located on the reference rotating axis. A side of the first driving face distant to the first end face is located on the reference plane.

In an example, the outer periphery of the driving portion further has a second peripheral face, a third peripheral face, a fourth peripheral face, a fifth peripheral face, and a sixth peripheral face. The end of the driving portion opposite to the neck portion includes a second end face connected to the second peripheral face. The second peripheral face is contiguous to the first peripheral face. The second end face includes a second side and a second angle located outside of the second side. The second side is located on the reference plane and is connected to the first driving face. The end of the first side adjacent to the reference rotating axis has an end point located on the reference rotating axis. An end of the second side is connected to the first side. An interconnection between the first side and the second side is located on the reference rotating axis. Another end of the second side opposite to the reference rotating axis is connected to the second peripheral face. The second angle is located between the reference plane and the neck portion.

The end of the driving portion opposite to the neck portion includes a third end face, a fourth end face, a fifth end face, and a sixth end face. The third end face is connected to the third peripheral face. The third peripheral face is contiguous to the second peripheral face and is located on a side of the second peripheral face opposite to the first peripheral face. The third end face includes a third side and a third angle located outside of the third side. The third side is located on the reference plane. An end of the third side is connected to the first side. An interconnection between the first side and the third side is located on the reference rotating axis. Another end of the third side opposite to the reference rotating axis is connected to the third peripheral face. The third angle is located between the reference plane and the neck portion.

The fourth end face is connected to the fourth peripheral face. The fourth peripheral face is contiguous to the third peripheral face and is located on a side of the third peripheral face opposite to the second peripheral face. The fourth end face includes a fourth side and a fourth angle located outside of the fourth side. The fourth side is located on the reference plane. An end of the fourth side is connected to the first side. The first side and the fourth side are located on the same line. An interconnection between the first side and the fourth side is located on the reference rotating axis. Another end of the fourth side opposite to the reference rotating axis is connected to the fourth peripheral face. The fourth angle is located between the reference plane and the neck portion.

The fifth end face is connected to the fifth peripheral face. The fifth peripheral face is contiguous to the fourth peripheral face and is located on a side of the fourth peripheral face opposite to the third peripheral face. The fifth end face includes a fifth side and a fifth angle located outside of the fifth side. The fifth side is located on the reference plane. An end of the fifth side is connected to the second side. An intersection between the second side and the fifth side is located on the reference rotating axis. Another end of the fifth side opposite to the reference rotating axis is connected to the fifth peripheral face. The fifth angle is located between the reference plane and the neck portion.

The sixth end face is connected to the sixth peripheral face. The sixth peripheral face is located between the first peripheral face and the fifth peripheral face. The sixth end face includes a sixth side and a sixth angle located outside of the sixth side. The sixth side is located on the reference plane. An end of the sixth side is connected to the third side. The third side and the sixth side are on the same line. An interconnection between the third side and the sixth side is located on the reference rotating axis. Another end of the sixth side opposite to the reference rotating axis is connected to the sixth peripheral face. The sixth angle is located between the reference plane and the neck portion.

The third end face is connected to a second driving face extending in a direction parallel to the reference rotating axis. The second driving face is connected to the third angle. The second driving face has an angle located on the reference rotating axis. A side of the second driving face distant to the third end face is located on the reference plane. The fourth side is connected to the second driving face. The fifth end face is connected to a third driving face extending in a direction parallel to the reference rotating axis. The third driving face is connected to the fifth angle. The third driving face has an angle located on the reference rotating axis. A side of the third driving face distant to the fifth end face is located on the reference plane. The sixth side is connected to the third driving face.

The second end face is connected to a fourth driving face extending in a direction parallel to the reference rotating axis. The fourth driving face is connected to the second angel. The fourth driving face has an angle located on the reference rotating axis. A side of the fourth driving face distant to the second end face is located on the reference plane. The third side is connected to the fourth driving face. The fourth end face is connected to a fifth driving face extending in a direction parallel to the reference rotating axis. The fifth driving face is connected to the fourth angle. The fifth driving face has an angle located on the reference rotating axis. A side of the fifth driving face distant to the fourth end face is located on the reference plane. The fifth side is connected to the fifth driving face. The sixth end face is connected to a sixth driving face extending in a direction parallel to the reference rotating axis. The sixth driving face is connected to the sixth angle. The sixth driving face has an angle located on the reference rotating axis. A side of the sixth driving face distant to the sixth end face is located on the reference plane. The first side is connected to the sixth driving face.

In an example, wherein each of the first, second, third, fourth, fifth, and sixth end faces is a slant face at a non-parallel angle to the reference plane.

In an example, the outer periphery of the driving portion further has a second peripheral face contiguous to the first peripheral face, a third peripheral face contiguous to the second peripheral face and located on a side of the second peripheral face opposite to the first peripheral face, a fourth peripheral face contiguous to the third peripheral face and located on a side of the third peripheral face opposite to the second peripheral face, a fifth peripheral face contiguous to the fourth peripheral face and is located on a side of the fourth peripheral face opposite to the third peripheral face, and a sixth peripheral face contiguous to the fifth peripheral face and located between the first peripheral face and the fifth peripheral face.

The end of the driving portion opposite to the neck portion includes a second end face connected to the second peripheral face, a third end face connected to the third peripheral face, a fourth end face connected to the fourth peripheral face, a fifth end face connected to the fifth peripheral face, and a sixth end face connected to the sixth peripheral face.

The second end face includes a second side located on the reference plane. The third end face includes a third side located on the reference plane. The fourth end face includes a fourth side located on the reference plane. The fifth end face includes a fifth side located on the reference plane. The sixth end face includes a sixth side located on the reference plane.

The end of the first side adjacent to the reference rotating axis has an end point not located on the reference rotating axis. The end of the second side is adjacent to the reference rotating axis and has an end point not located on the reference rotating axis. The end of the third side is adjacent to the reference rotating axis and has an end point not located on the reference rotating axis. The end of the fourth side is adjacent to the reference rotating axis and has an end point not located on the reference rotating axis. The end of the fifth side is adjacent to the reference rotating axis and has an end point not located on the reference rotating axis. The end of the sixth side is adjacent to the reference rotating axis and has an end point not located on the reference rotating axis.

The third end face is connected to a second driving face extending in a direction parallel to the reference rotating axis. The fifth end face is connected to a third driving face extending in a direction parallel to the reference rotating axis. The second end face is connected to a fourth driving face extending in a direction parallel to the reference rotating axis. The fourth end face is connected to a fifth driving face extending in a direction parallel to the reference rotating axis. The sixth end face is connected to a sixth driving face extending in a direction parallel to the reference rotating axis.

The first driving face does not intersect with the reference rotating axis. The second driving face does not intersect with the reference rotating axis. The third driving face does not intersect with the reference rotating axis. The fourth driving face does not intersect with the reference rotating axis. The fifth driving face does not intersect with the reference rotating axis. The sixth driving face does not intersect with the reference rotating axis.

The second end face is located on a side of the first driving face opposite to the first end face and is not connected to the first driving face. The second side is located on a side of the second end face adjacent to the first driving face. The fourth end face is located on a side of the second driving face opposite to the third end face and does not intersect with the second driving face. The fourth side is located on a side of the fourth end face adjacent to the second driving face. The sixth end face is located on a side of the third driving face opposite to the fifth end face and does not intersect with the third driving face. The sixth side is located on a side of the sixth end face adjacent to the third driving face. The third end face is located on a side of the fourth driving face opposite to the first end face and does not intersect with the fourth driving face. The third side is located on a side of the third end face adjacent to the fourth driving face. The fifth end face is located on a side of the fifth driving face opposite to the fourth end face and does not intersect with the fifth driving face. The fifth side is located on a side of the fifth end face adjacent to the fifth driving face. The first end face is located on a side of the sixth driving face opposite to the sixth end face and does not intersect with the sixth driving face. The first side is located on a side of the first end face adjacent to the sixth driving face.

The end of the driving portion opposite to the neck portion further includes a seventh end face. The seventh end face is a planar face extending perpendicularly to the reference rotating axis and is located on the reference plane. The seventh end face is connected to the first end face, the first driving face, the second end face, the second driving face, the third end face, the third driving face, the fourth end face, the fourth driving face, the fifth end face, the fifth driving face, the sixth end face, and the sixth driving face. An outer periphery of the seventh end face surrounding the reference rotating axis is connected to the first peripheral face, the second peripheral face, the third peripheral face, the fourth peripheral face, the fifth peripheral face, and the sixth peripheral face.

In an example, the outer periphery of the driving portion further has a second peripheral face contiguous to the first peripheral face, a third peripheral face contiguous to the second peripheral face and located on a side of the second peripheral face opposite to the first peripheral face, a fourth peripheral face contiguous to the third peripheral face and located on a side of the third peripheral face opposite to the second peripheral face, a fifth peripheral face contiguous to the fourth peripheral face and is located on a side of the fourth peripheral face opposite to the third peripheral face, and a sixth peripheral face contiguous to the fifth peripheral face and located between the first peripheral face and the fifth peripheral face.

The end of the driving portion opposite to the neck portion includes a second end face connected to the second peripheral face, a third end face connected to the third peripheral face, a fourth end face connected to the fourth peripheral face, a fifth end face connected to the fifth peripheral face, a sixth end face connected to the sixth peripheral face, and a seventh end face is located on a side of the first end face opposite to the first driving face.

The end of the driving portion opposite to the neck portion further includes a hole centered at the longitudinal axis and extending along the longitudinal axis, a side of the first end face opposite to the first peripheral face is connected to the hole, and an end of the first side adjacent to the longitudinal axis and an end of the first driving face adjacent to the longitudinal axis are connected to the hole.

The second end face includes a second side located on the reference plane. The third end face includes a third side located on the reference plane. The fourth end face includes a fourth side located on the reference plane. The fifth end face includes a fifth side located on the reference plane. The sixth end face includes a sixth side located on the reference plane.

The third end face is connected to a second driving face extending in a direction parallel to the reference rotating axis. The fifth end face is connected to a third driving face extending in a direction parallel to the reference rotating axis. The second end face is connected to a fourth driving face extending in a direction parallel to the reference rotating axis. The fourth end face is connected to a fifth driving face extending in a direction parallel to the reference rotating axis. The sixth end face is connected to a sixth driving face extending in a direction parallel to the reference rotating axis.

A side of the second end face opposite to the second peripheral face is connected to the hole. An end of the second side adjacent to the longitudinal axis and an end of the fourth driving face adjacent to the longitudinal axis are connected to the hole. A side of the third end face opposite to the third peripheral face is connected to the hole. An end of the third side adjacent to the longitudinal axis and an end of the second driving face adjacent to the longitudinal axis are connected to the hole. A side of the fourth end face opposite to the fourth peripheral face is connected to the hole. An end of the fourth side adjacent to the longitudinal axis and an end of the fifth driving face adjacent to the longitudinal axis are connected to the hole. A side of the fifth end face opposite to the fifth peripheral face is connected to the hole. An end of the fifth side adjacent to the longitudinal axis and an end of the third driving face adjacent to the longitudinal axis are connected to the hole. A side of the sixth end face opposite to the sixth peripheral face is connected to the hole. An end of the sixth side adjacent to the longitudinal axis and an end of the sixth driving face adjacent to the longitudinal axis are connected to the hole.

The end of the driving portion opposite to the neck portion includes an eighth end face, a ninth end face, a tenth end face, an eleventh end face, and a twelfth end face, wherein each of the eighth, ninth, tenth, eleventh, and twelfth end faces is a planar face extending perpendicularly to the longitudinal axis and is located on the reference plane.

An end of the seventh end face is connected to the hole. Another end of the seventh end face is connected to the first peripheral face. A side of the seventh end face is connected to the first end face. The first side is formed between the first end face and the seventh end face. The eighth end face is located on a side of the second end face opposite to the fourth driving face. An end of the eighth end face is connected to the hole. Another end of the eighth end face is connected to the second peripheral face. A side of the eighth end face is connected to the second end face. The second side is formed between the second end face and the eighth end face. The ninth end face is located on a side of the third end face opposite to the second driving face. An end of the ninth end face is connected to the hole. Another end of the ninth end face is connected to the third peripheral face. A side of the ninth end face is connected to the third end face. The third side is formed between the third end face and the ninth end face.

The tenth end face is located on a side of the fourth end face opposite to the fifth driving face. An end of the tenth end face is connected to the hole. Another end of the tenth end face is connected to the fourth peripheral face. A side of the tenth end face is connected to the fourth end face. The fourth side is formed between the fourth end face and the tenth end face. The eleventh end face is located on a side of the fifth end face opposite to the third driving face. An end of the eleventh end face is connected to the hole. Another end of the eleventh end face is connected to the fifth peripheral face. A side of the eleventh end face is connected to the fifth end face. The fifth side is formed between the fifth end face and the eleventh end face. The twelfth end face is located on a side of the sixth end face opposite to the sixth driving face. An end of the twelfth end face is connected to the hole. Another end of the twelfth end face is connected to the sixth peripheral face. A side of the twelfth end face is connected to the sixth end face. The sixth side is formed between the sixth end face and the twelfth end face.

In an example, the outer periphery of the driving portion further has a second peripheral face contiguous to the first peripheral face, a third peripheral face contiguous to the second peripheral face and located on a side of the second peripheral face opposite to the first peripheral face, a fourth peripheral face contiguous to the third peripheral face and located on a side of the third peripheral face opposite to the second peripheral face, a fifth peripheral face contiguous to the fourth peripheral face and is located on a side of the fourth peripheral face opposite to the third peripheral face, and a sixth peripheral face contiguous to the fifth peripheral face and located between the first peripheral face and the fifth peripheral face.

The end of the driving portion opposite to the neck portion includes a second end face connected to the second peripheral face, a third end face connected to the third peripheral face, a fourth end face connected to the fourth peripheral face, a fifth end face connected to the fifth peripheral face, and a sixth end face connected to the sixth peripheral face.

The second end face includes a second side located on the reference plane. The third end face includes a third side located on the reference plane. The fourth end face includes a fourth side located on the reference plane. The fifth end face includes a fifth side located on the reference plane. The sixth end face includes a sixth side located on the reference plane.

The first peripheral face has a lateral width in a radial direction perpendicular to the longitudinal axis. An end of the first side adjacent to the longitudinal axis and another end of the first side connected to the first peripheral face have a first length therebetween. An end of the second side adjacent to the longitudinal axis and another end of the second side connected to the second peripheral face have a second length therebetween. An end of the third side adjacent to the longitudinal axis and another end of the third side connected to the third peripheral face have a third length therebetween. An end of the fourth side adjacent to the longitudinal axis and another end of the fourth side connected to the fourth peripheral face have a fourth length therebetween. An end of the fifth side adjacent to the longitudinal axis and another end of the fifth side connected to the fifth peripheral face have a fifth length therebetween. An end of the sixth side adjacent to the longitudinal axis and another end of the sixth side connected to the sixth peripheral face have a sixth length therebetween, and each of the first length, the second length, the third length, the fourth length, the fifth length, and the sixth length is smaller than 0.5 times the lateral width.

The third end face is connected to a second driving face extending in a direction parallel to the reference rotating axis. The fifth end face is connected to a third driving face extending in a direction parallel to the reference rotating axis. The second end face is connected to a fourth driving face extending in a direction parallel to the reference rotating axis. The fourth end face is connected to a fifth driving face extending in a direction parallel to the reference rotating axis. The sixth end face is connected to a sixth driving face extending in a direction parallel to the reference rotating axis.

The end of the driving portion opposite to the neck portion includes a seventh end face. The seventh end face is a planar face extending perpendicularly to the reference rotating axis and located on the reference plane. The seventh end face is connected to the first end face, the first driving face, the second end face, the second driving face, the third end face, the third driving face, the fourth end face, the fourth driving face, the fifth end face, the fifth driving face, the sixth end face, and the sixth driving face. An outer periphery of the seventh end face surrounding the reference rotating axis is connected to the first peripheral face, the second peripheral face, the third peripheral face, the fourth peripheral face, the fifth peripheral face, and the sixth peripheral face.

The first driving face connected to the seventh end face intersects with the first side. The side of the first driving face and the first side have a first angle therebetween. A side of the fourth driving face connected to the seventh end face intersects with the second side. The side of the fourth driving face and the second side have a second angle therebetween. A side of the second driving face connected to the seventh end face intersects with the third side. The side of the second driving face and the third side have a third angle therebetween. A side of the fifth driving face connected to the seventh end face intersects with the fourth side. The side of the fifth driving face and the fourth side have a fourth angle therebetween, wherein side of the third driving face connected to the seventh end face intersects with the fifth side.

The side of the third driving face and the fifth side have a fifth angle therebetween, wherein side of the sixth driving face connected to the seventh end face intersects with the sixth side. The side of the sixth driving face and the sixth side have a sixth angle therebetween, and wherein each of the first angle, the second angle, the third angle, the fourth angle, the fifth angle, and the sixth angle is larger than 80°.

In an example, the outer periphery of the driving portion further has a second peripheral face contiguous to the first peripheral face, a third peripheral face contiguous to the second peripheral face and located on a side of the second peripheral face opposite to the first peripheral face, a fourth peripheral face contiguous to the third peripheral face and located on a side of the third peripheral face opposite to the second peripheral face, a fifth peripheral face contiguous to the fourth peripheral face and is located on a side of the fourth peripheral face opposite to the third peripheral face, and a sixth peripheral face contiguous to the fifth peripheral face and located between the first peripheral face and the fifth peripheral face.

The end of the driving portion opposite to the neck portion includes a second end face connected to the second peripheral face, a third end face connected to the third peripheral face, a fourth end face connected to the fourth peripheral face, a fifth end face connected to the fifth peripheral face, and a sixth end face connected to the sixth peripheral face.

The second end face includes a second side located on the reference plane. The third end face includes a third side located on the reference plane. The fourth end face includes a fourth side located on the reference plane. The fifth end face includes a fifth side located on the reference plane. The sixth end face includes a sixth side located on the reference plane.

The third end face is connected to a second driving face extending in a direction parallel to the reference rotating axis. The fifth end face is connected to a third driving face extending in a direction parallel to the reference rotating axis. The second end face is connected to a fourth driving face extending in a direction parallel to the reference rotating axis. The fourth end face is connected to a fifth driving face extending in a direction parallel to the reference rotating axis. The sixth end face is connected to a sixth driving face extending in a direction parallel to the reference rotating axis.

The end of the first side adjacent to the longitudinal axis is connected to the sixth driving face. The first driving face does not intersect with the first side. The end of the second side adjacent to the longitudinal axis is connected to the first driving face. The fourth driving face does not intersect with the second side. The end of the third side adjacent to the longitudinal axis is connected to the fourth driving face. The second driving face does not intersect with the third side. The end of the fourth side adjacent to the longitudinal axis is connected to the second driving face. The fifth driving face does not intersect with the fourth side. The end of the fifth side adjacent to the longitudinal axis is connected to the fifth driving face. The third driving face does not intersect with the fifth side. The end of the sixth side adjacent to the longitudinal axis is connected to the third driving face. The sixth driving face does not intersect with the sixth side.

The end of the driving portion opposite to the neck portion further includes a seventh end face, an eighth end face, a ninth end face, a tenth end face, an eleventh end face, and a twelfth end face, wherein each of the seventh, eighth, ninth, tenth, eleventh, and twelfth end faces is a planar face extending perpendicularly to the longitudinal axis and is located on the reference plane.

The seventh end face is connected to the first peripheral face, the first end face, and the sixth driving face. The first side is formed between the first end face and the seventh end face. The eighth end face is connected to the second peripheral face, the second end face, and the first driving face. The second side is formed between the second end face and the eighth end face. The ninth end face is connected to the third peripheral face, the third end face, and the fourth driving face. The third side is formed between the third end face and the ninth end face.

The tenth end face is connected to the fourth peripheral face, the fourth end face, and the second driving face. The fourth side is formed between the fourth end face and the tenth end face. The eleventh end face is connected to the fifth peripheral face, the fifth end face, and the fifth driving face. The fifth side is formed between the fifth end face and the eleventh end face. The twelfth end face is connected to the sixth peripheral face, the sixth end face, and the third driving face. The sixth side is formed between the sixth end face and the twelfth end face.

In an example, the outer periphery of the driving portion further has a second peripheral face contiguous to the first peripheral face, a third peripheral face contiguous to the second peripheral face and located on a side of the second peripheral face opposite to the first peripheral face, a fourth peripheral face contiguous to the third peripheral face and located on a side of the third peripheral face opposite to the second peripheral face, a fifth peripheral face contiguous to the fourth peripheral face and is located on a side of the fourth peripheral face opposite to the third peripheral face, and a sixth peripheral face contiguous to the fifth peripheral face and located between the first peripheral face and the fifth peripheral face.

The end of the driving portion opposite to the neck portion includes a second end face connected to the second peripheral face, a third end face connected to the third peripheral face, a fourth end face connected to the fourth peripheral face, a fifth end face connected to the fifth peripheral face, and a sixth end face connected to the sixth peripheral face.

The second end face includes a second side located on the reference plane. The third end face includes a third side located on the reference plane. The fourth end face includes a fourth side located on the reference plane. The fifth end face includes a fifth side located on the reference plane. The sixth end face includes a sixth side located on the reference plane.

The end of the first side adjacent to the reference rotating axis has an end point not located on the reference rotating axis. An end of the second side is adjacent to the reference rotating axis and has an end point not located on the reference rotating axis. An end of the third side is adjacent to the reference rotating axis and has an end point not located on the reference rotating axis. An end of the fourth side is adjacent to the reference rotating axis and has an end point not located on the reference rotating axis. An end of the fifth side is adjacent to the reference rotating axis and has an end point not located on the reference rotating axis. And an end of the sixth side is adjacent to the reference rotating axis and has an end point not located on the reference rotating axis.

The third end face is connected to a second driving face extending in a direction parallel to the reference rotating axis. The fifth end face is connected to a third driving face extending in a direction parallel to the reference rotating axis. The second end face is connected to a fourth driving face extending in a direction parallel to the reference rotating axis. The fourth end face is connected to a fifth driving face extending in a direction parallel to the reference rotating axis. The sixth end face is connected to a sixth driving face extending in a direction parallel to the reference rotating axis.

The first driving face does not intersect with the reference rotating axis. The second driving face does not intersect with the reference rotating axis. The third driving face does not intersect with the reference rotating axis. The fourth driving face does not intersect with the reference rotating axis. The fifth driving face does not intersect with the reference rotating axis. The sixth driving face does not intersect with the reference rotating axis.

The second end face is located on a side of the first driving face opposite to the first end face and is not connected to the first driving face. The second side is located on a side of the second end face adjacent to the first driving face. The fourth end face is located on a side of the second driving face opposite to the third end face and does not intersect with the second driving face. The fourth side is located on a side of the fourth end face adjacent to the second driving face. The sixth end face is located on a side of the third driving face opposite to the fifth end face and does not intersect with the third driving face. The sixth side is located on a side of the sixth end face adjacent to the third driving face. The third end face is located on a side of the fourth driving face opposite to the first end face and does not intersect with the fourth driving face. The third side is located on a side of the third end face adjacent to the fourth driving face. The fifth end face is located on a side of the fifth driving face opposite to the fourth end face and does not intersect with the fifth driving face. The fifth side is located on a side of the fifth end face adjacent to the fifth driving face. The first end face is located on a side of the sixth driving face opposite to the sixth end face and does not intersect with the sixth driving face. The first side is located on a side of the first end face adjacent to the sixth driving face.

The end of the driving portion opposite to the neck portion further includes a seventh end face. The seventh end face is a planar face extending perpendicularly to the reference rotating axis and is located on the reference plane. The seventh end face is connected to the first end face, the first driving face, the second end face, the second driving face, the third end face, the third driving face, the fourth end face, the fourth driving face, the fifth end face, the fifth driving face, the sixth end face, and the sixth driving face. An outer periphery of the seventh end face surrounding the reference rotating axis is connected to the first peripheral face, the second peripheral face, the third peripheral face, the fourth peripheral face, the fifth peripheral face, and the sixth peripheral face.

A first slant recess is formed between the first end face and the first driving face and extends from the seventh end face to the first peripheral face. A second slant recess is formed between the second end face and the fourth driving face and extends from the seventh end face to the second peripheral face. A third slant recess is formed between the third end face and the second driving face and extends from the seventh end face to the third peripheral face. A fourth slant recess is formed between the fourth end face and the fifth driving face and extends from the seventh end face to the fourth peripheral face. A fifth slant recess is formed between the fifth end face and the third driving face and extends from the seventh end face to the fifth peripheral face. A sixth slant recess is formed between the sixth end face and the sixth driving face and extends from the seventh end face to the sixth peripheral face.

The present invention will become clearer in light of the following detailed description of illustrative embodiments of this invention described in connection with the drawings.

DETAILED DESCRIPTION OF THE INVENTION

Figure 1:
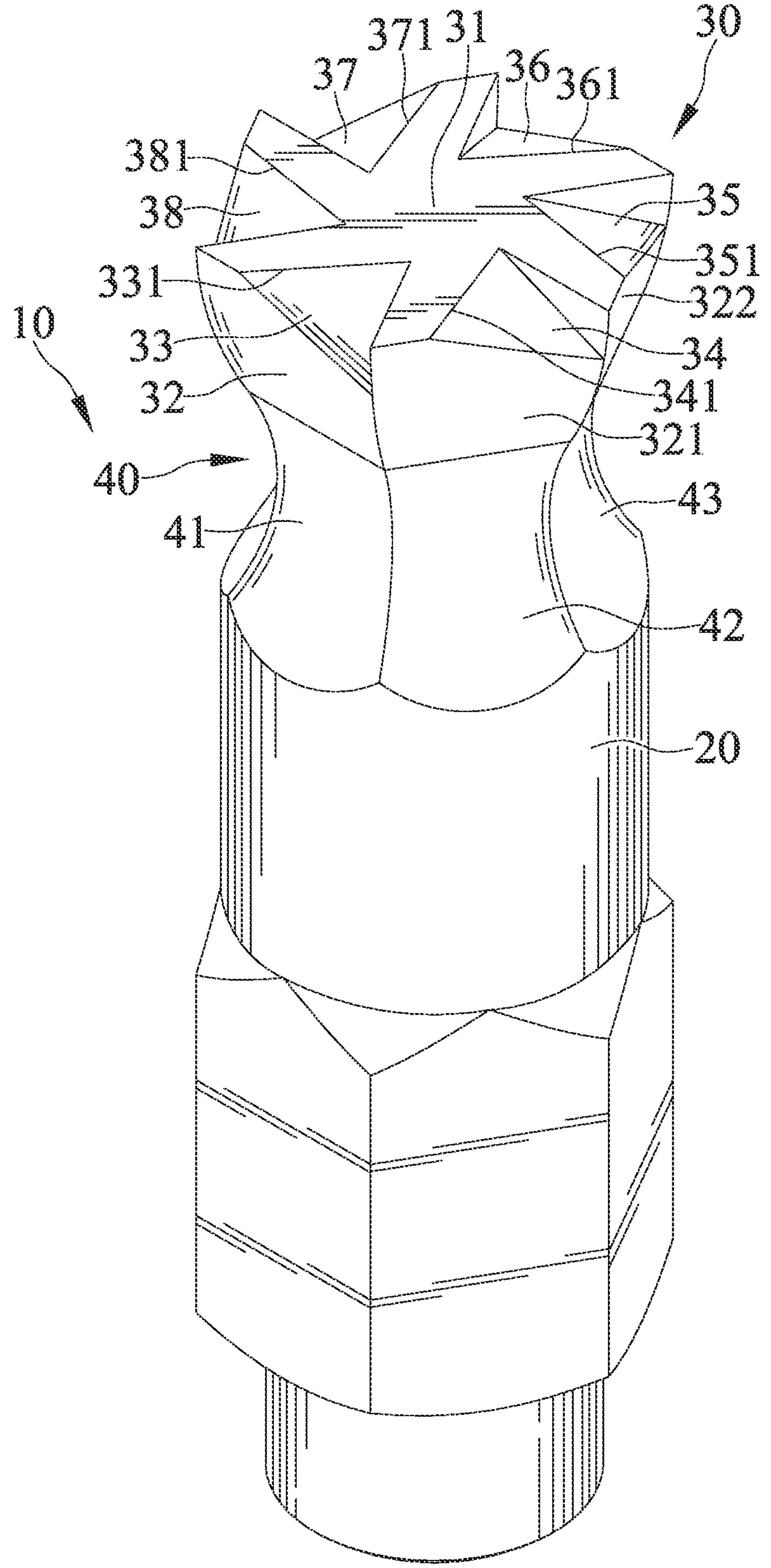
FIG. 1 is a perspective view of an anti-slip driving tool of a first embodiment according to the present invention.
Figure 2:
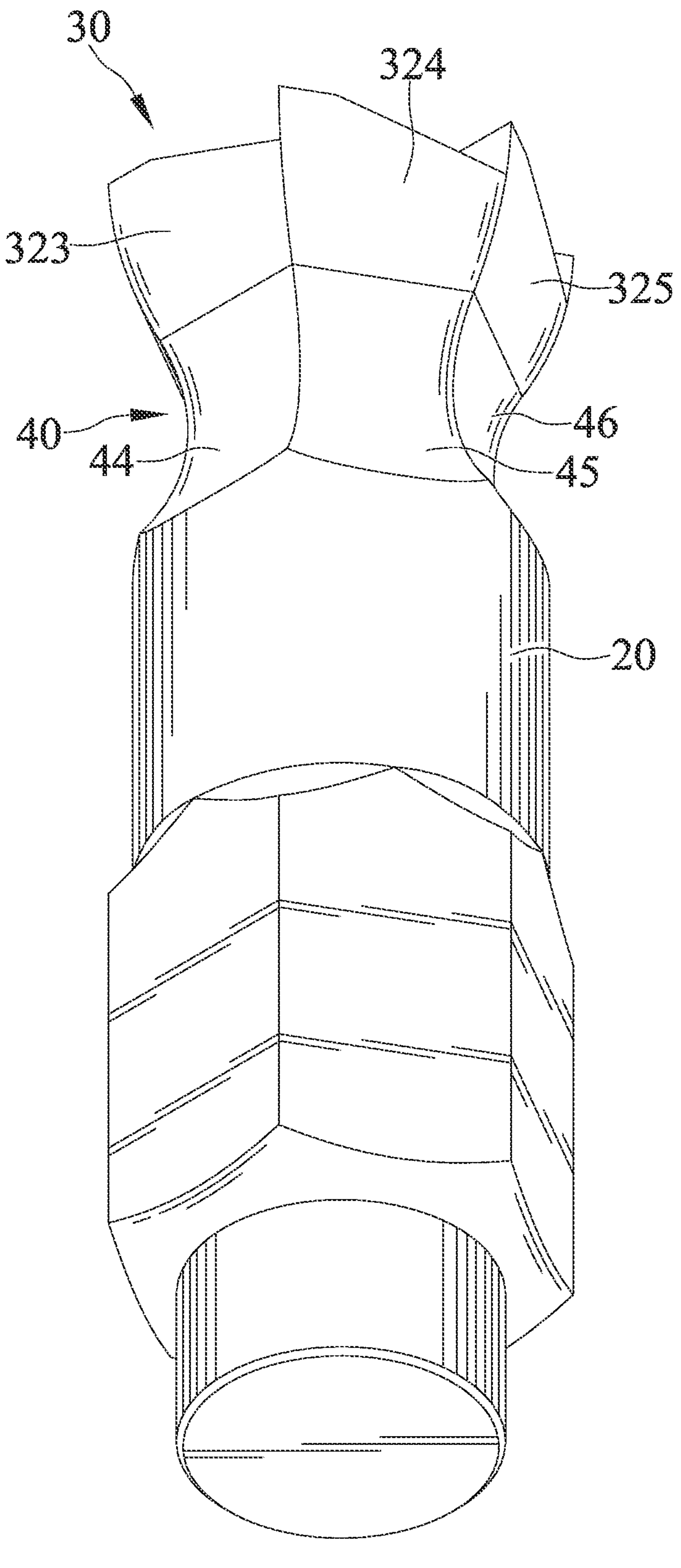
FIG. 2 is another perspective view of the anti-slip driving tool of FIG. 1.
Figure 3:
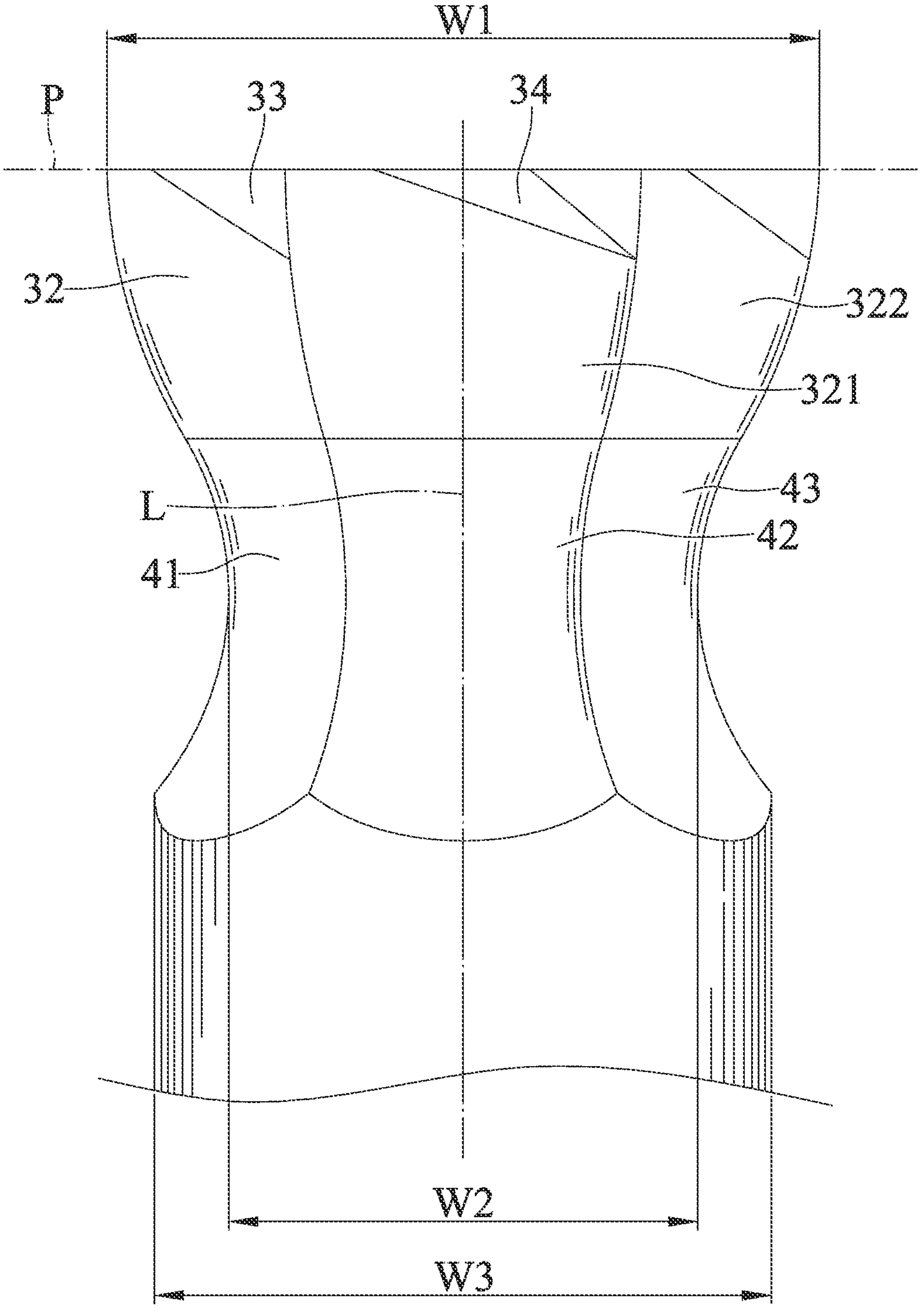
FIG. 3 is a partial, side elevational view of the anti-slip driving tool of FIG. 1.
Figure 4:
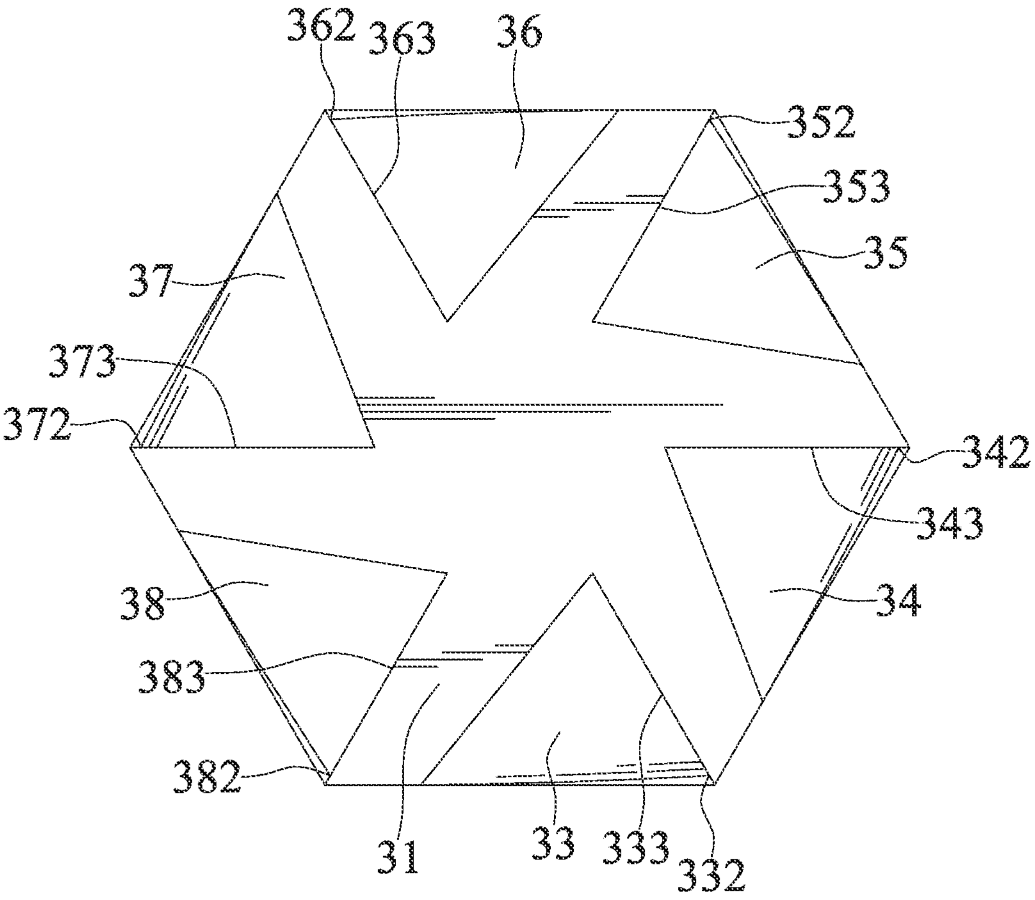
FIG. 4 is an end elevational view of the anti-slip driving tool of FIG. 1.

FIGS. 1-4 show an anti-slip driving tool 10 of a first embodiment according to the present invention. The anti-slip driving tool 10 includes a body portion 20, a driving portion 30, and a neck portion 40 formed between the body portion 20 and the driving portion 30.

The driving portion 30 defines a reference rotating axis L, and a distal end of the driving portion 30 opposite to the body portion 20 is provided with a front driving face 31 having a first width W1 in a radial direction of the reference rotating axis L.

The neck portion 40 has a second width W2 in the radial direction of the reference rotating axis L, and the second width W2 is less than the first width W1.

In the embodiment, the front driving face 31 may be a plane perpendicular to the reference rotating axis L.

An outer periphery of the driving portion 30 in the radial direction of the reference rotating axis L is provided with a first peripheral face 32. An end of the driving portion 30 opposite to the body portion 20 defines a reference plane P and a first rear bevel face 33. The reference plane P is perpendicular to the reference rotating axis L. The front driving face 31 is located in the reference plane P. A side of the first rear bevel face 33 is connected to the front driving face 31 and forms a first side 331. An end of the first side 331 is adjacent to the reference rotating axis L, and another end of the first side 331 opposite to the reference rotating axis L is connected to the first peripheral face 32. The first rear bevel face 33 is provided with a first corner 332 not located on the first side 331 and disposed between the reference plane P and the body portion 20.

The first rear bevel face 33 is connected to a first driving face 333 extending in a direction parallel to the reference rotating axis L. The first driving face 333 is connected to the first corner 332, and a side of the first driving face 333 opposite to the first rear bevel face 33 is connected to the front driving face 31.

The body portion 20 has a third width W3 in the radial direction of the reference rotating axis L, and the second width W2 is less than the third width W3.

The outer periphery of the driving portion 30 in the radial direction of the reference rotating axis L is further provided with a second peripheral face 321, a third peripheral face 322, a fourth peripheral face 323, a fifth peripheral face 324, and a sixth peripheral face 325. The first peripheral face 32 and the fourth peripheral face 323 are respectively disposed at two opposite sides of the driving portion 30. The second peripheral face 321 and the fifth peripheral face 324 are respectively disposed at two opposite sides of the driving portion 30. The third peripheral face 322 and the sixth peripheral face 325 are respectively disposed at two opposite sides of the driving portion 30.

The end of the driving portion 30 opposite to the body portion 20 is further provided with a second rear bevel face 34, a third rear bevel face 35, a fourth rear bevel face 36, a fifth rear bevel face 37, and a sixth rear bevel face 38.

A side of the second rear bevel face 34 is connected to the front driving face 31 and forms a second side 341. An end of the second side 341 is adjacent to the reference rotating axis L, and another end of the second side 341 opposite to the reference rotating axis L is connected to the second peripheral face 321. The second rear bevel face 34 is provided with a second corner 342 not located on the second side 341 and disposed between the reference plane P and the body portion 20. The second rear bevel face 34 is connected to a second driving face 343 extending in a direction parallel to the reference rotating axis L. The second driving face 343 is connected to the second corner 342, and a side of the second driving face 343 opposite to the second rear bevel face 34 is connected to the front driving face 31.

A side of the third rear bevel face 35 is connected to the front driving face 31 and forms a third side 351. An end of the third side 351 is adjacent to the reference rotating axis L, and another end of the third side 351 opposite to the reference rotating axis L is connected to the third peripheral face 322. The third rear bevel face 35 is provided with a third corner 352 not located on the third side 351 and disposed between the reference plane P and the body portion 20. The third rear bevel face 35 is connected to a third driving face 353 extending in a direction parallel to the reference rotating axis L. The third driving face 353 is connected to the third corner 352, and a side of the third driving face 353 opposite to the third rear bevel face 35 is connected to the front driving face 31.

A side of the fourth rear bevel face 36 is connected to the front driving face 31 and forms a fourth side 361. An end of the fourth side 361 is adjacent to the reference rotating axis L, and another end of the fourth side 361 opposite to the reference rotating axis L is connected to the fourth peripheral face 323. The fourth rear bevel face 36 is provided with a fourth corner 362 not located on the fourth side 361 and disposed between the reference plane P and the body portion 20. The fourth rear bevel face 36 is connected to a fourth driving face 363 extending in a direction parallel to the reference rotating axis L. The fourth driving face 363 is connected to the fourth corner 362, and a side of the fourth driving face 363 opposite to the fourth rear bevel face 36 is connected to the front driving face 31.

A side of the fifth rear bevel face 37 is connected to the front driving face 31 and forms a fifth side 371. An end of the fifth side 371 is adjacent to the reference rotating axis L, and another end of the fifth side 371 opposite to the reference rotating axis L is connected to the fifth peripheral face 324. The fifth rear bevel face 37 is provided with a fifth corner 372 not located on the fifth side 371 and disposed between the reference plane P and the body portion 20. The fifth rear bevel face 37 is connected to a fifth driving face 373 extending in a direction parallel to the reference rotating axis L. The fifth driving face 373 is connected to the fifth corner 372, and a side of the fifth driving face 373 opposite to the fifth rear bevel face 37 is connected to the front driving face 31.

A side of the sixth rear bevel face 38 is connected to the front driving face 31 and forms a sixth side 381. An end of the sixth side 381 is adjacent to the reference rotating axis L, and another end of the sixth side 381 opposite to the reference rotating axis L is connected to the sixth peripheral face 325. The sixth rear bevel face 38 is provided with a sixth corner 382 not located on the sixth side 381 and disposed between the reference plane P and the body portion 20. The sixth rear bevel face 38 is connected to a sixth driving face 383 extending in a direction parallel to the reference rotating axis L. The sixth driving face 383 is connected to the sixth corner 382, and a side of the sixth driving face 383 opposite to the sixth rear bevel face 38 is connected to the front driving face 31.

A width between the first peripheral face 32 and the fourth peripheral face 323 in the radial direction of the reference rotating axis L is tapered from an end adjacent to the front driving face 31 to another end adjacent to the neck portion 40. A width between the second peripheral face 321 and the fifth peripheral face 324 in the radial direction of the reference rotating axis L is tapered from an end adjacent to the front driving face 31 to another end adjacent to the neck portion 40. A width between the third peripheral face 322 and the sixth peripheral face 325 in the radial direction of the reference rotating axis L is tapered from an end adjacent to the front driving face 31 to another end adjacent to the neck portion 40.

An outer periphery of the neck portion 40 in the radial direction of the reference rotating axis L is provided with a first neck surface 41, a second neck surface 42, a third neck surface 43, a fourth neck surface 44, a fifth neck surface 45, and a sixth neck surface 46. Each of the first, second, third, fourth, fifth and sixth neck surfaces 41, 42, 43, 44, 45 and 46 is a concave surface. An end of the first neck surface 41 is connected to the first peripheral face 32, and another end of the first neck surface 41 is connected to the body portion 20. An end of the second neck surface 42 is connected to the second peripheral face 321, and another end of the second neck surface 42 is connected to the body portion 20. An end of the third neck surface 43 is connected to the third peripheral face 322, and another end of the third neck surface 43 is connected to the body portion 20. An end of the fourth neck surface 44 is connected to the fourth peripheral face 323, and another end of the fourth neck surface 44 is connected to the body portion 20. An end of the fifth neck surface 45 is connected to the fifth peripheral face 324, and another end of the fifth neck surface 45 is connected to the body portion 20. An end of the sixth neck surface 46 is connected to the sixth peripheral face 325, and another end of the sixth neck surface 46 is connected to the body portion 20.

Figure 5:
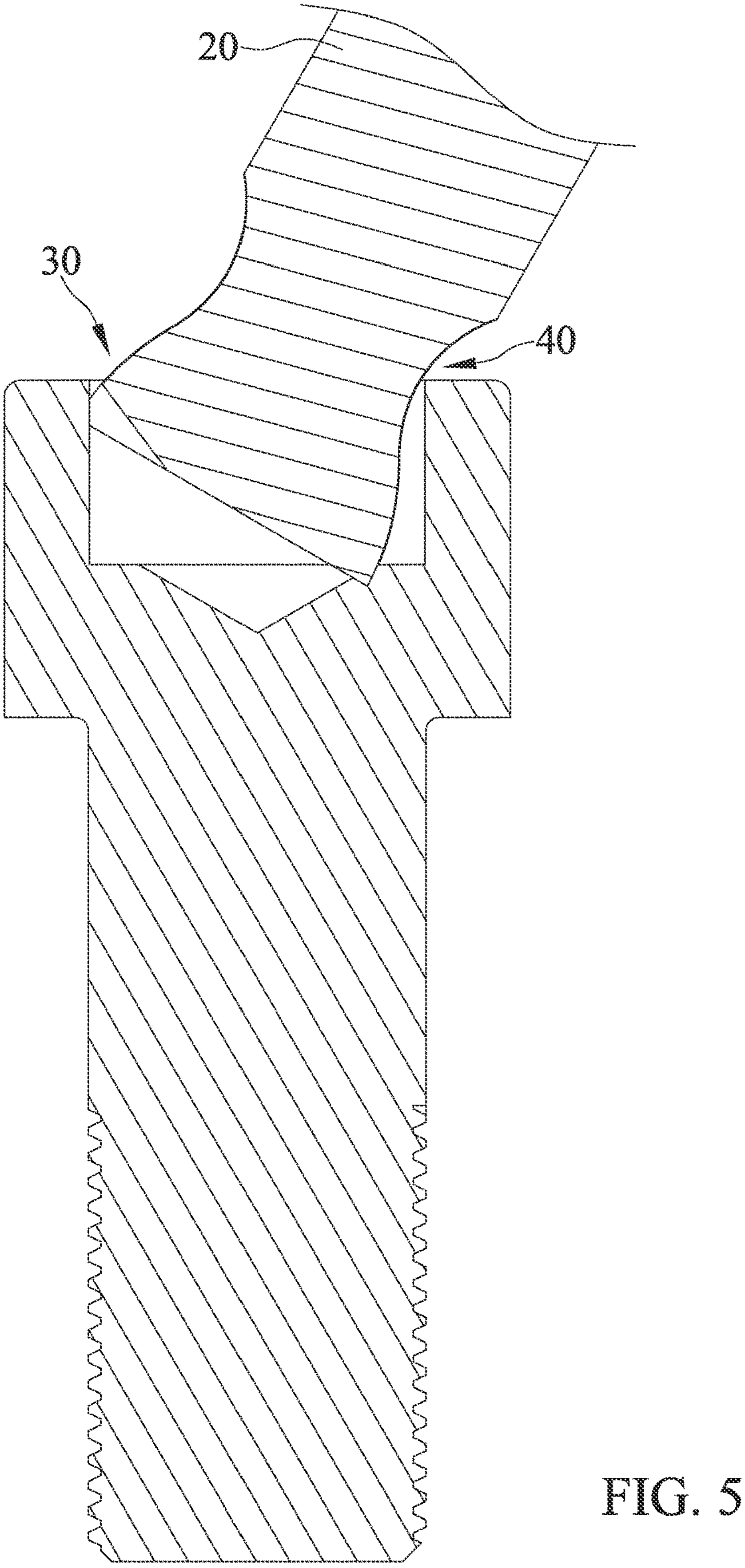
FIG. 5 is a cross-sectioned view of the anti-slip driving tool of FIG. 1, and illustrates the anti-slip driving tool used to drive a fastener.
Figure 6:
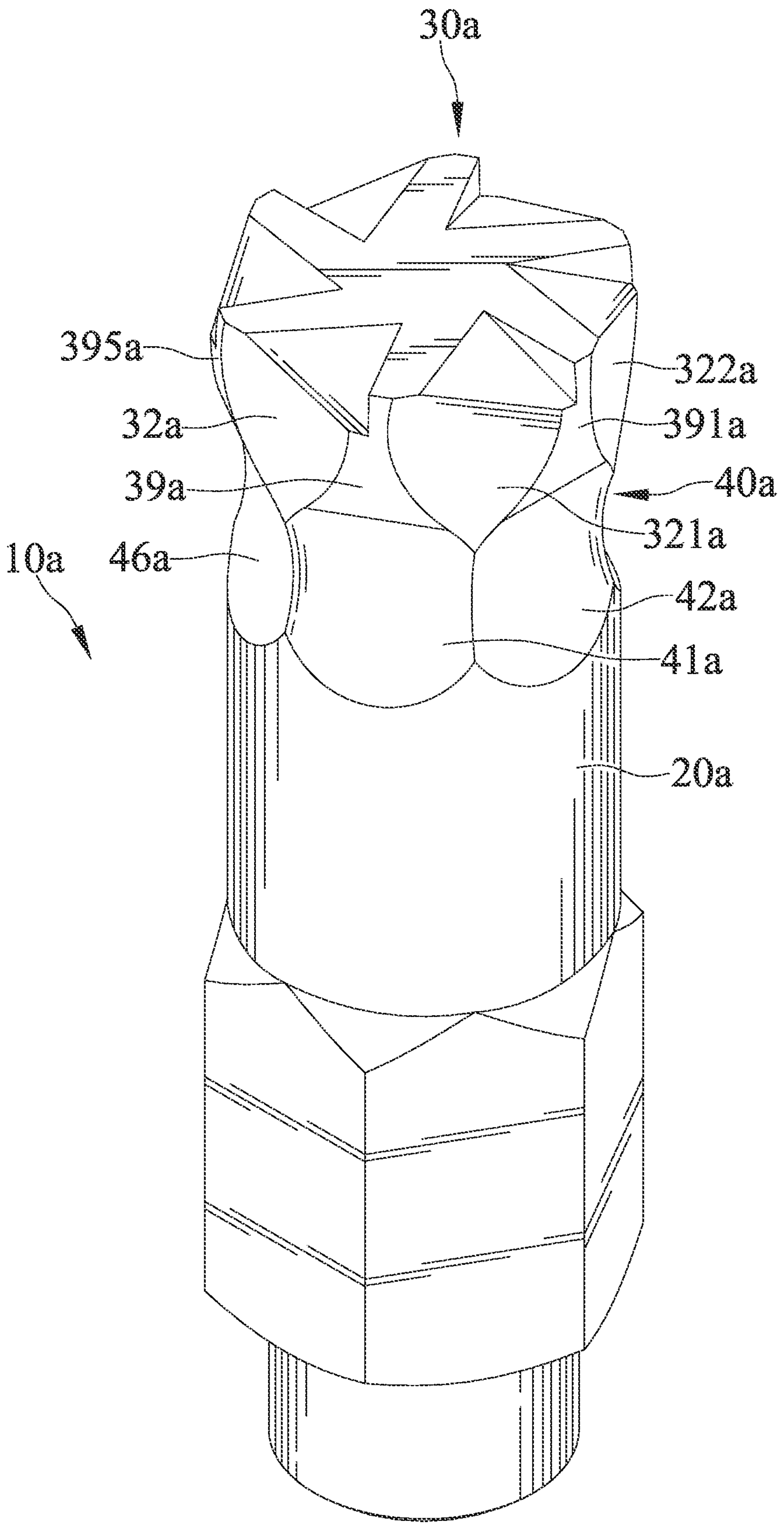
FIG. 6 is a perspective view of an anti-slip driving tool of a second embodiment according to the present invention.
Figure 7:
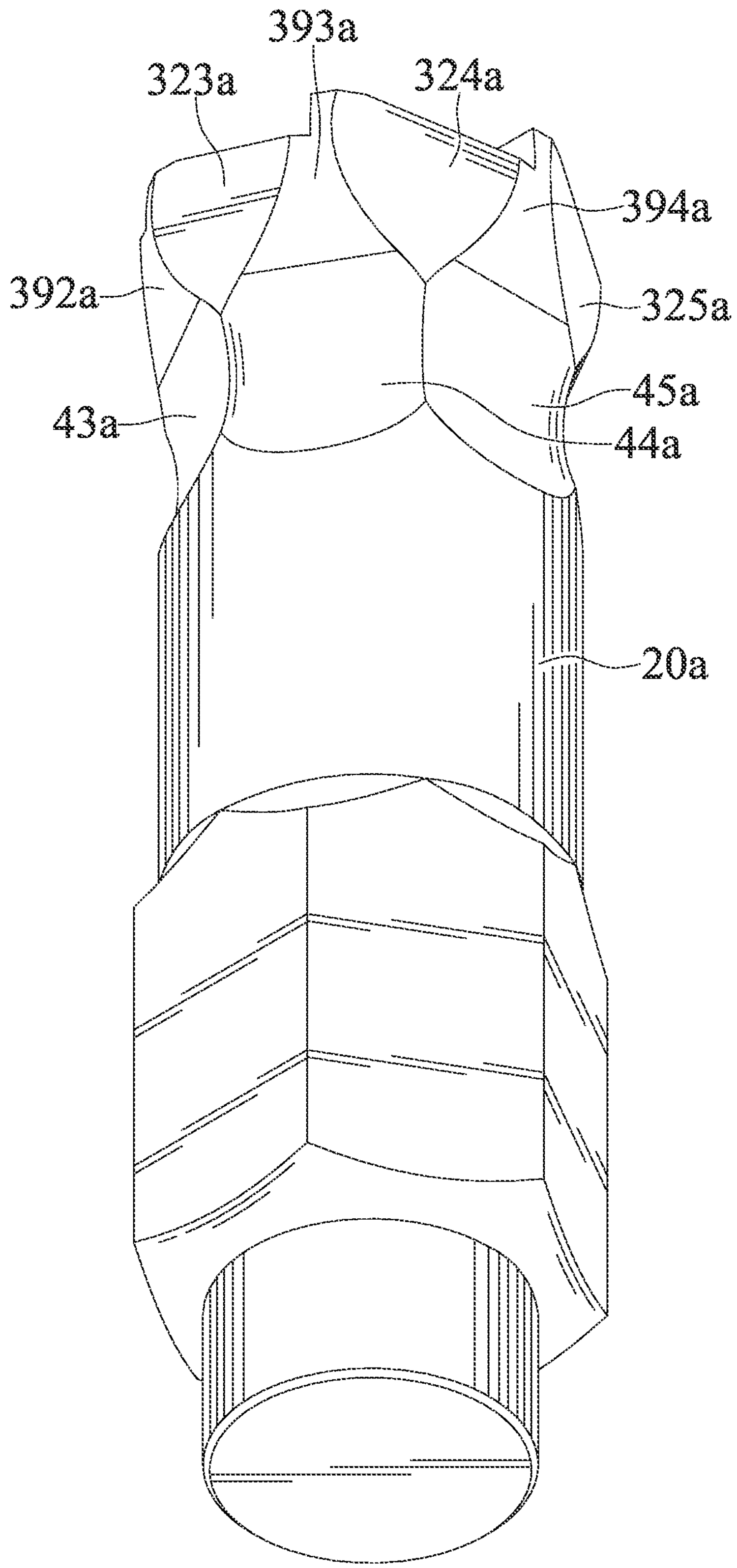
FIG. 7 is another perspective view of the anti-slip driving tool of FIG. 6.
Figure 8:
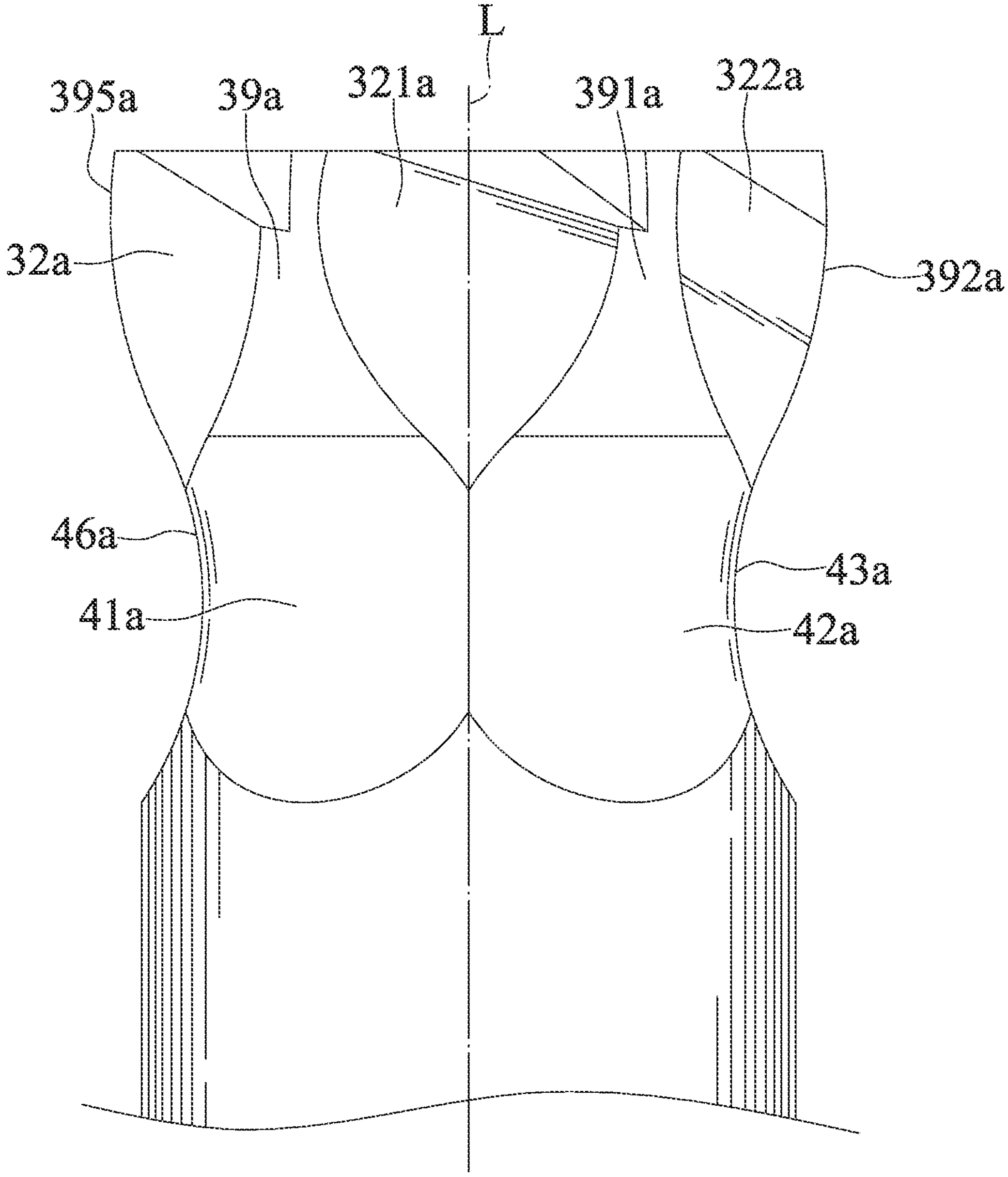
FIG. 8 is a partial, side elevational view of the anti-slip driving tool of FIG. 6.
Figure 9:
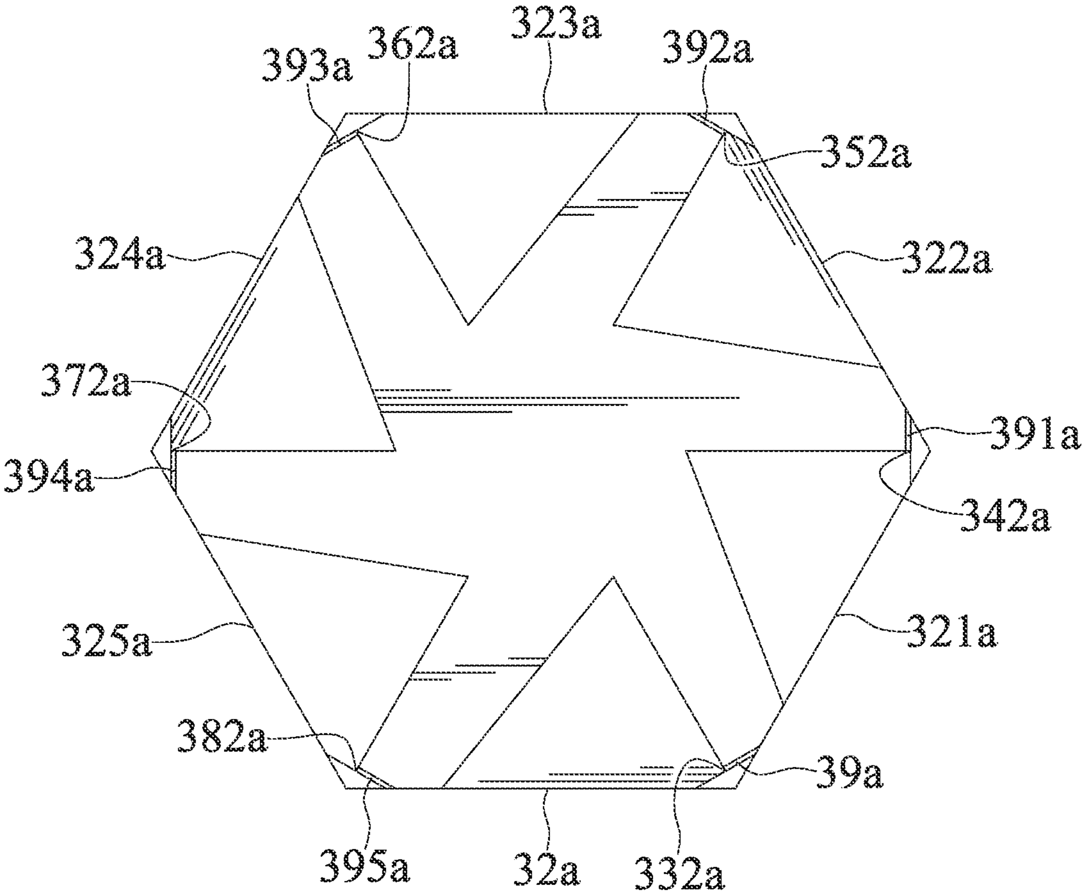
FIG. 9 is an end elevational view of the anti-slip driving tool of FIG. 6.

FIG. 5 shows the anti-slip driving tool 10 to be used at an angle off-axis to an object to be driven, such as a screw with a driving hole. The anti-slip driving tool 10 can drive the damaged object in an oblique direction by the above structure and achieve a good anti-slip effect. Even if the driving hole of the object is damaged, the object can still be rotated smoothly. When the anti-slip driving tool 10 is in use, the driving portion 30 is inserted into the damaged driving hole in the oblique direction, and the corners 332, 342, 352, 362, 372 and 382 of the front driving face 31 contact the inner wall of the damaged driving hole to drive the object to rotate.

FIGS. 6-9 show an anti-slip driving tool 10*a* in accordance with a second embodiment of the present invention, and the same numbers are used to correlate similar components of the first embodiment, but bearing a letter a. The second embodiment is substantially the same as the first embodiment but is mainly different from the first embodiment by that the outer periphery of the driving portion 30*a* in the radial direction of the reference rotating axis L is further provided with a seventh peripheral face 39*a*, an eighth peripheral face 391*a*, a ninth peripheral face 392*a*, a tenth peripheral face 393*a*, an eleventh peripheral face 394*a*, and a twelfth peripheral face 395*a*.

The seventh peripheral face 39*a* is disposed between the first peripheral face 32*a* and the second peripheral face 321*a* and is connected to the first corner 332*a*. The eighth peripheral face 391*a* is disposed between the second peripheral face 321*a* and the third peripheral face 322*a* and is connected to the second corner 342*a*. The ninth peripheral face 392*a* is disposed between the third peripheral face 322*a* and the fourth peripheral face 323*a* and is connected to the third corner 352*a*. The tenth peripheral face 393*a* is disposed between the fourth peripheral face 323*a* and the fifth peripheral face 324*a* and is connected to the fourth corner 362*a*. The seventh peripheral face 39*a* and the tenth peripheral face 393*a* are respectively disposed at two opposite sides of the driving portion 30*a*. The eleventh peripheral face 394*a* is disposed between the fifth peripheral face 324*a* and the sixth peripheral face 325*a* and is connected to the fifth corner 372*a*. The eighth peripheral face 391*a* and the eleventh peripheral face 394*a* are respectively disposed at two opposite sides of the driving portion 30*a*. The twelfth peripheral face 395*a* is disposed between the sixth peripheral face 325*a* and the first peripheral face 32*a* and is connected to the sixth corner 382*a*. The ninth peripheral face 392*a* and the twelfth peripheral face 395*a* are respectively disposed at two opposite sides of the driving portion 30*a*.

A width between the first peripheral face 32*a* and the fourth peripheral face 323*a* in the radial direction of the reference rotating axis L is equal to a width between the second peripheral face 321*a* and the fifth peripheral face 324*a* in the radial direction of the reference rotating axis L, and is equal to a width between the third peripheral face 322*a* and the sixth peripheral face 325*a* in the radial direction of the reference rotating axis L.

A width between the seventh peripheral face 39*a* and the tenth peripheral face 393*a* in the radial direction of the reference rotating axis L is equal to a width between the eighth peripheral face 391*a* and the eleventh peripheral face 394*a* in the radial direction of the reference rotating axis L, and is equal to a width between the ninth peripheral face 392*a* and the twelfth peripheral face 395*a* in the radial direction of the reference rotating axis L.

The width between the first peripheral face 32*a* and the fourth peripheral face 323*a* in the radial direction of the reference rotating axis L is less than the width between the seventh peripheral face 39*a* and the tenth peripheral face 393*a* in the radial direction of the reference rotating axis L.

An outer periphery of the neck portion 40*a* in the radial direction of the reference rotating axis L is provided with a first neck surface 41*a*, a second neck surface 42*a*, a third neck surface 43*a*, a fourth neck surface 44*a*, a fifth neck surface 45*a*, and a sixth neck surface 46*a*. Each of the first, second, third, fourth, fifth and sixth neck surfaces 41*a*, 42*a*, 43*a*, 44*a*, 45*a* and 46*a* is a concave surface.

An end of the first neck surface 41*a* is connected to the seventh peripheral face 39*a*, and another end of the first neck surface 41*a* is connected to the body portion 20*a*. An end of the second neck surface 42*a* is connected to the eighth peripheral face 391*a*, and another end of the second neck surface 42*a* is connected to the body portion 20*a*. An end of the third neck surface 43*a* is connected to the ninth peripheral face 392*a*, and another end of the third neck surface 43*a* is connected to the body portion 20*a*. An end of the fourth neck surface 44*a* is connected to the tenth peripheral face 393*a*, and another end of the fourth neck surface 44*a* is connected to the body portion 20*a*. An end of the fifth neck surface 45*a* is connected to the eleventh peripheral face 394*a*, and another end of the fifth neck surface 45*a* is connected to the body portion 20*a*. An end of the sixth neck surface 46*a* is connected to the twelfth peripheral face 395*a*, and another end of the sixth neck surface 46*a* is connected to the body portion 20*a*.

Figure 10:
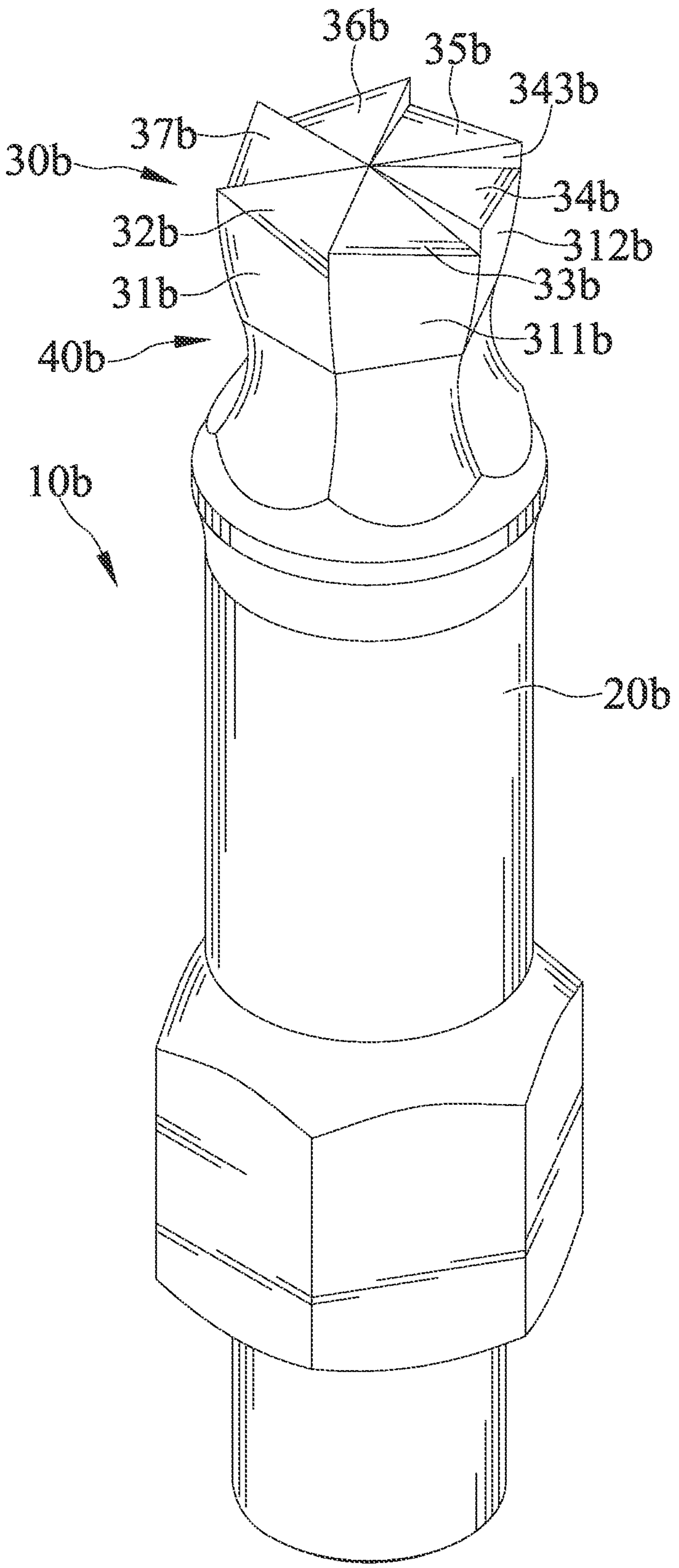
FIG. 10 is a perspective view of an anti-slip driving tool of a third embodiment according to the present invention.
Figure 11:
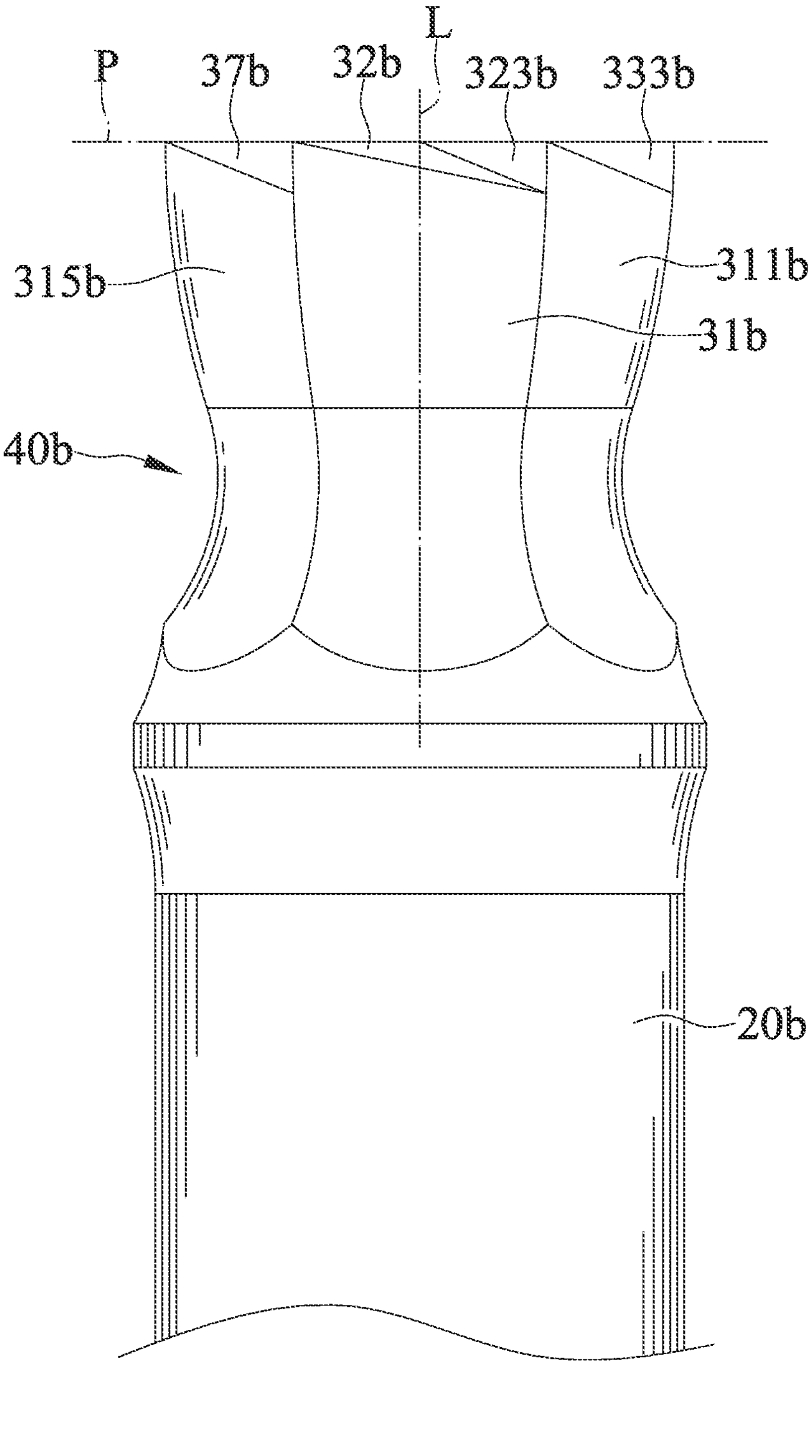
FIG. 11 is a partial, side elevational view of the anti-slip driving tool of FIG. 10.
Figure 12:
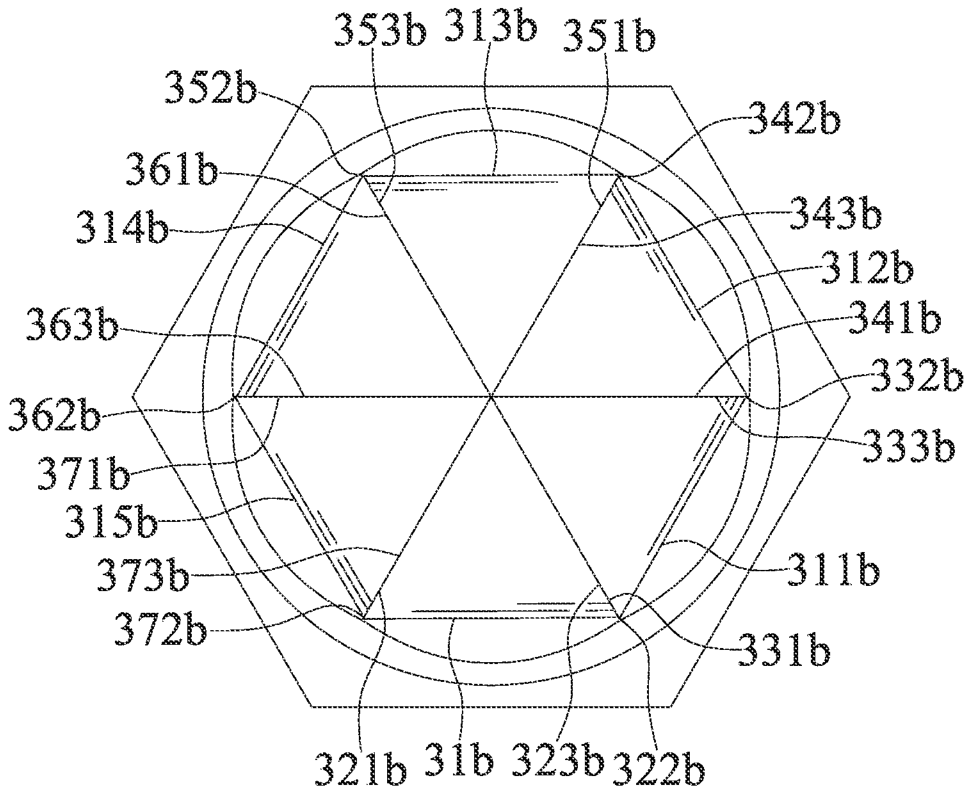
FIG. 12 is an end elevational view of the anti-slip driving tool of FIG. 10.

FIGS. 10-12 show an anti-slip driving tool 10*b* in accordance with a third embodiment of the present invention, and the same numbers are used to correlate similar components of the first embodiment, but bearing a letter b. The third embodiment is substantially the same as the first embodiment but is mainly different from the first embodiment by that the anti-slip driving tool 10*b* includes a body portion 20*b*, a driving portion 30*b*, and a neck portion 40*b* formed between the body portion 20*b* and the driving portion 30*b*.

The driving portion 30*b* includes an outer periphery surrounding the reference rotating axis L and having a first peripheral face 31*b*, a second peripheral face 311*b*, a third peripheral face 312*b*, a fourth peripheral face 313*b*, a fifth peripheral face 314*b*, and a sixth peripheral face 315*b*.

An end of the driving portion 30*b* opposite to the neck portion 40*b* includes a first end face 32*b* connected to the first peripheral face 31*b*. The first end face 32*b* includes a first side 321*b* and a first angle 322*b* located outside of the first side 321*b*. The end of the driving portion 30*b* opposite to the neck portion 40*b* includes a reference plane P perpendicular to the reference rotating axis L. The first side 321*b* is located on the reference plane P. An end of the first side 321*b* is adjacent to the reference rotating axis L, and another end of the first side 321*b* opposite to the reference rotating axis L is connected to the first peripheral face 31*b*. The first angle 322*b* is located between the reference plane P and the neck portion 40*b*.

The first end face 32*b* is connected to a first driving face 323*b* extending in a direction parallel to the reference rotating axis L. The first driving face 323*b* is connected to the first angle 322*b*. The first driving face 323*b* includes an angle located on the reference rotating axis L. A side of the first driving face 323*b* distant to the first end face 32*b* is located on the reference plane P.

The end of the driving portion 30*b* opposite to the neck portion 40*b* includes a second end face 33*b* connected to the second peripheral face 311*b*. The second peripheral face 311*b* is contiguous to the first peripheral face 31*b*. The second end face 33*b* includes a second side 331*b* and a second angle 332*b* located outside of the second side 331*b*. The second side 331*b* is located on the reference plane P and is connected to the first driving face 323*b*. The end of the first side 321*b* adjacent to the reference rotating axis L has an end point located on the reference rotating axis L. An end of the second side 331*b* is connected to the first side 321*b*. An interconnection between the first side 321*b* and the second side 331*b* is located on the reference rotating axis L. Another end of the second side 331*b* opposite to the reference rotating axis L is connected to the second peripheral face 311*b*. The second angle 332*b* is located between the reference plane P and the neck portion 40*b*.

The end of the driving portion 30*b* opposite to the neck portion 40*b* includes a third end face 34*b*, a fourth end face 35*b*, a fifth end face 36*b*, and a sixth end face 37*b*. The third end face 34*b* is connected to the third peripheral face 312*b*. The third peripheral face 312*b* is contiguous to the second peripheral face 311*b* and is located on a side of the second peripheral face 311*b* opposite to the first peripheral face 31*b*. The third end face 34*b* includes a third side 341*b* and a third angle 342*b* located outside of the third side 341*b*. The third side 341*b* is located on the reference plane P. An end of the third side 341*b* is connected to the first side 321*b*. An interconnection between the first side 321*b* and the third side 341*b* is located on the reference rotating axis L. Another end of the third side 341*b* opposite to the reference rotating axis L is connected to the third peripheral face 312*b*. The third angle 342*b* is located between the reference plane P and the neck portion 40*b*.

The fourth end face 35*b* is connected to the fourth peripheral face 313*b*. The fourth peripheral face 313*b* is contiguous to the third peripheral face 312*b* and is located on a side of the third peripheral face 312*b* opposite to the second peripheral face 311*b*. The fourth end face 35*b* includes a fourth side 351*b* and a fourth angle 352*b* located outside of the fourth side 351*b*. The fourth side 351*b* is located on the reference plane P. An end of the fourth side 351*b* is connected to the first side 321*b*. The first side 321*b* and the fourth side 351*b* are located on the same line. An interconnection between the first side 321*b* and the fourth side 351*b* is located on the reference rotating axis L. Another end of the fourth side 351*b* opposite to the reference rotating axis L is connected to the fourth peripheral face 313*b*. The fourth angle 352*b* is located between the reference plane P and the neck portion 40*b*.

The fifth end face 36*b* is connected to the fifth peripheral face 314*b*. The fifth peripheral face 314*b* is contiguous to the fourth peripheral face 313*b* and is located on a side of the fourth peripheral face 313*b* opposite to the third peripheral face 312*b*. The fifth end face 36*b* includes a fifth side 361*b* and a fifth angle 362*b* located outside of the fifth side 361*b*. The fifth side 361*b* is located on the reference plane P. An end of the fifth side 361*b* is connected to the second side 331*b*. An intersection between the second side 331*b* and the fifth side 361*b* is located on the reference rotating axis L. Another end of the fifth side 361*b* opposite to the reference rotating axis L is connected to the fifth peripheral face 314*b*. The fifth angle 362*b* is located between the reference plane P and the neck portion 40*b*.

The sixth end face 37*b* is connected to the sixth peripheral face 315*b*. The sixth peripheral face 315*b* is located between the first peripheral face 31*b* and the fifth peripheral face 314*b*. The sixth end face 37*b* includes a sixth side 371*b* and a sixth angle 372*b* located outside of the sixth side 371*b*. The sixth side 371*b* is located on the reference plane P. An end of the sixth side 371*b* is connected to the third side 341*b*. The third side 341*b* and the sixth side 371*b* are on the same line. An interconnection between the third side 341*b* and the sixth side 371*b* is located on the reference rotating axis L. Another end of the sixth side 371*b* opposite to the reference rotating axis L is connected to the sixth peripheral face 315*b*. The sixth angle 372*b* is located between the reference plane P and the neck portion 40*b*.

The third end face 34*b* is connected to a second driving face 343*b* extending in a direction parallel to the reference rotating axis L. The second driving face 343*b* is connected to the third angle 342*b*. The second driving face 343*b* has an angle located on the reference rotating axis L. A side of the second driving face 343*b* distant to the third end face 34*b* is located on the reference plane P. The fourth side 351*b* is connected to the second driving face 343*b*. The fifth end face 36*b* is connected to a third driving face 363*b* extending in a direction parallel to the reference rotating axis L. The third driving face 363*b* is connected to the fifth angle 362*b*. The third driving face 363*b* has an angle located on the reference rotating axis L. A side of the third driving face 363*b* distant to the fifth end face 36*b* is located on the reference plane P. The sixth side 371*b* is connected to the third driving face 363*b*.

The second end face 33*b* is connected to a fourth driving face 333*b* extending in a direction parallel to the reference rotating axis L. The fourth driving face 333*b* is connected to the second angel 332*b*. The fourth driving face 333*b* has an angle located on the reference rotating axis L. A side of the fourth driving face 333*b* distant to the second end face 33*b* is located on the reference plane P. The third side 341*b* is connected to the fourth driving face 333*b*. The fourth end face 35*b* is connected to a fifth driving face 353*b* extending in a direction parallel to the reference rotating axis L. The fifth driving face 353*b* is connected to the fourth angle 352*b*. The fifth driving face 353*b* has an angle located on the reference rotating axis L. A side of the fifth driving face 353*b* distant to the fourth end face 35*b* is located on the reference plane P. The fifth side 361*b* is connected to the fifth driving face 353*b*. The sixth end face 37*b* is connected to a sixth driving face 373*b* extending in a direction parallel to the reference rotating axis L. The sixth driving face 373*b* is connected to the sixth angle 372*b*. The sixth driving face 373*b* has an angle located on the reference rotating axis L.

A side of the sixth driving face 373*b* distant to the sixth end face 37*b* is located on the reference plane P. The first side 321*b* is connected to the sixth driving face 373*b*.

In this embodiment, each of the first, second, third, fourth, fifth, and sixth end faces 32*b*-37*b* is a slant face at a non-parallel angle to the reference plane P.

Figure 13:
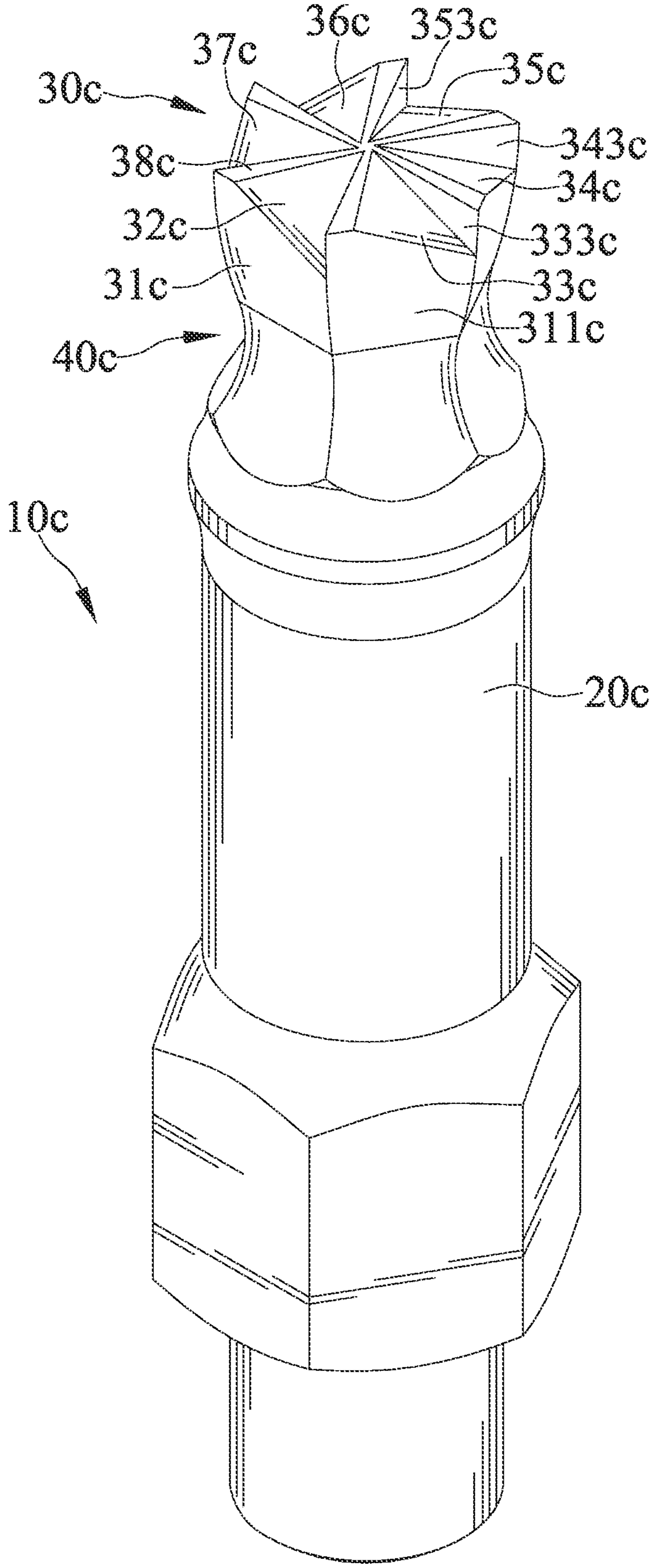
FIG. 13 is a perspective view of an anti-slip driving tool of a fourth embodiment according to the present invention.
Figure 14:
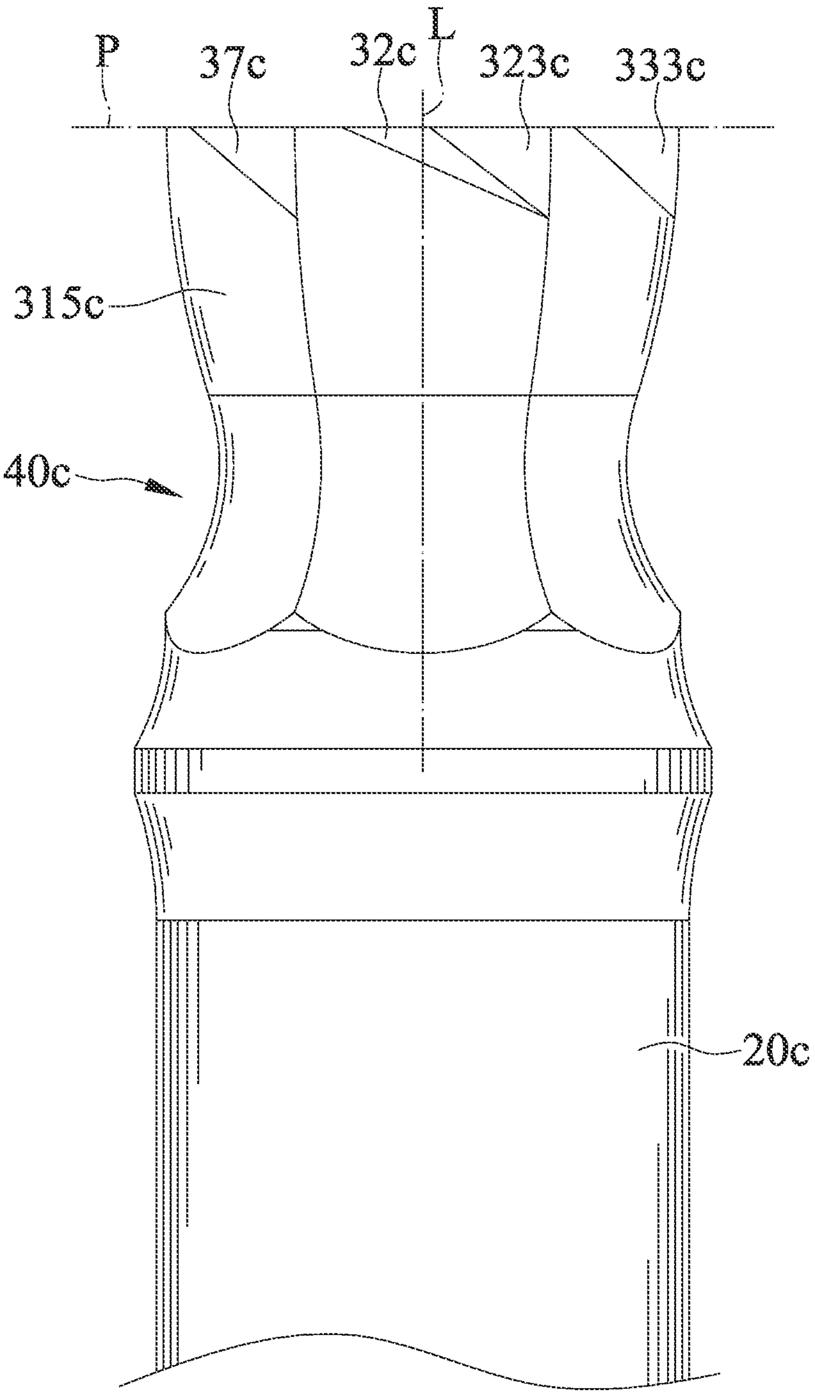
FIG. 14 is a partial, side elevational view of the anti-slip driving tool of FIG. 13.
Figure 15:
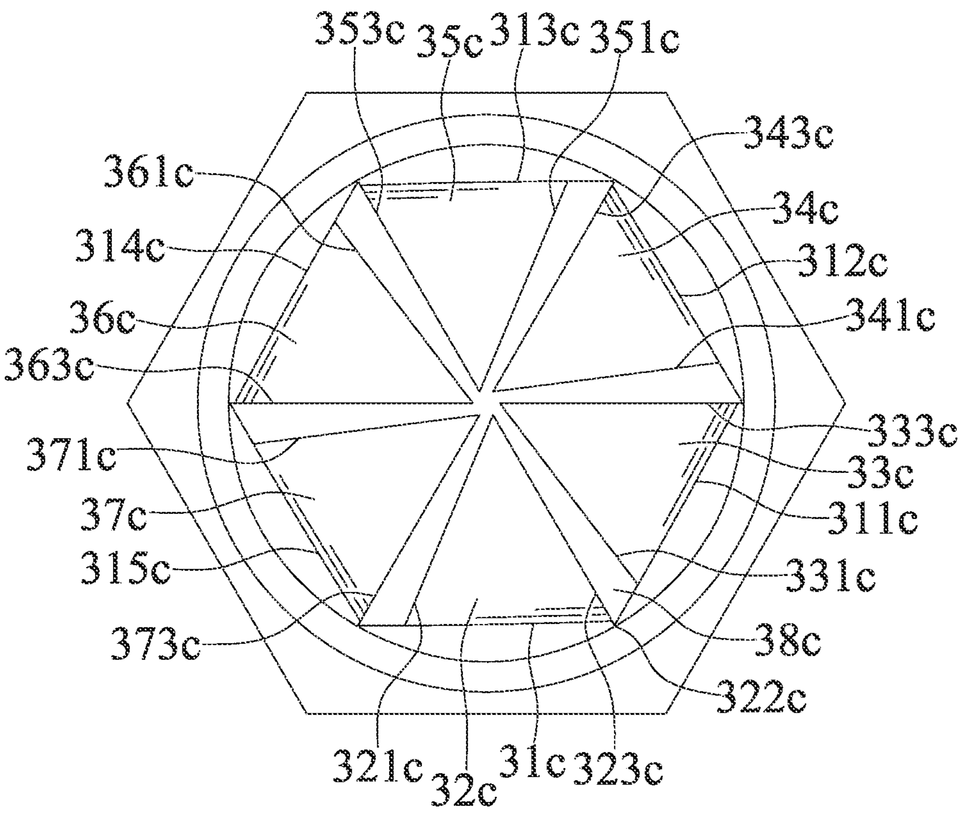
FIG. 15 is an end elevational view of the anti-slip driving tool of FIG. 13.

FIGS. 13-15 show an anti-slip driving tool 10*c* in accordance with a fourth embodiment of the present invention, and the same numbers are used to correlate similar components of the third embodiment, but bearing a letter c. The fourth embodiment is substantially the same as the third embodiment but is mainly different from the third embodiment by that the anti-slip driving tool 10*c* includes a body portion 20*c*, a driving portion 30*c*, and a neck portion 40*c* formed between the body portion 20*c* and the driving portion 30*c*.

An end of the first side 321*c* adjacent to the reference rotating axis L has an end point not located on the reference rotating axis L, an end of the second side 331*c* is adjacent to the reference rotating axis L and has an end point not located on the reference rotating axis L, an end of the third side 341*c* is adjacent to the reference rotating axis L and has an end point not located on the reference rotating axis L, an end of the fourth side 351*c* is adjacent to the reference rotating axis L and has an end point not located on the reference rotating axis L, an end of the fifth side 361*c* is adjacent to the reference rotating axis L and has an end point not located on the reference rotating axis L, and an end of the sixth side 371*c* is adjacent to the reference rotating axis L and has an end point not located on the reference rotating axis L.

The first driving face 323*c* does not intersect with the reference rotating axis L. The second driving face 343*c* does not intersect with the reference rotating axis L. The third driving face 363*c* does not intersect with the reference rotating axis L. The fourth driving face 333*c* does not intersect with the reference rotating axis L. The fifth driving face 353*c* does not intersect with the reference rotating axis L. The sixth driving face 373*c* does not intersect with the reference rotating axis L.

The second end face 33*c* is located on a side of the first driving face 323*c* opposite to the first end face 32*c* and is not connected to the first driving face 323*c*. The second side 331*c* is located on a side of the second end face 33*c* adjacent to the first driving face 323*c*. The fourth end face 35*c* is located on a side of the second driving face 343*c* opposite to the third end face 34*c* and does not intersect with the second driving face 343*c*. The fourth side 351*c* is located on a side of the fourth end face 35*c* adjacent to the second driving face 343*c*. The sixth end face 37*c* is located on a side of the third driving face 363*c* opposite to the fifth end face 36*c* and does not intersect with the third driving face 363*c*. The sixth side 371*c* is located on a side of the sixth end face 37*c* adjacent to the third driving face 363*c*. The third end face 34*c* is located on a side of the fourth driving face 333*c* opposite to the first end face 32*c* and does not intersect with the fourth driving face 333*c*. The third side 341*c* is located on a side of the third end face 34*c* adjacent to the fourth driving face 333*c*. The fifth end face 36*c* is located on a side of the fifth driving face 353*c* opposite to the fourth end face 35*c* and does not intersect with the fifth driving face 353*c*. The fifth side 361*c* is located on a side of the fifth end face 36*c* adjacent to the fifth driving face 353*c*. The first end face 32*c* is located on a side of the sixth driving face 373*c* opposite to the sixth end face 37*c* and does not intersect with the sixth driving face 373*c*. The first side 321*c* is located on a side of the first end face 32*c* adjacent to the sixth driving face 373*c*.

The end of the driving portion 30*c* opposite to the neck portion 40*c* includes a seventh end face 38*c*. The seventh end face 38*c* is a planar face extending perpendicularly to the reference rotating axis L and is located on the reference plane P. The seventh end face 38*c* is connected to the first end face 32*c*, the first driving face 323*c*, the second end face 33*c*, the second driving face 343*c*, the third end face 34*c*, the third driving face 363*c*, the fourth end face 35*c*, the fourth driving face 333*c*, the fifth end face 36*c*, the fifth driving face 353*c*, the sixth end face 37*c*, and the sixth driving face 373*c*. An outer periphery of the seventh end face 38*c* surrounding the reference rotating axis L is connected to the first peripheral face 31*c*, the second peripheral face 311*c*, the third peripheral face 312*c*, the fourth peripheral face 313*c*, the fifth peripheral face 314*c*, and the sixth peripheral face 315*c*.

Figure 16:
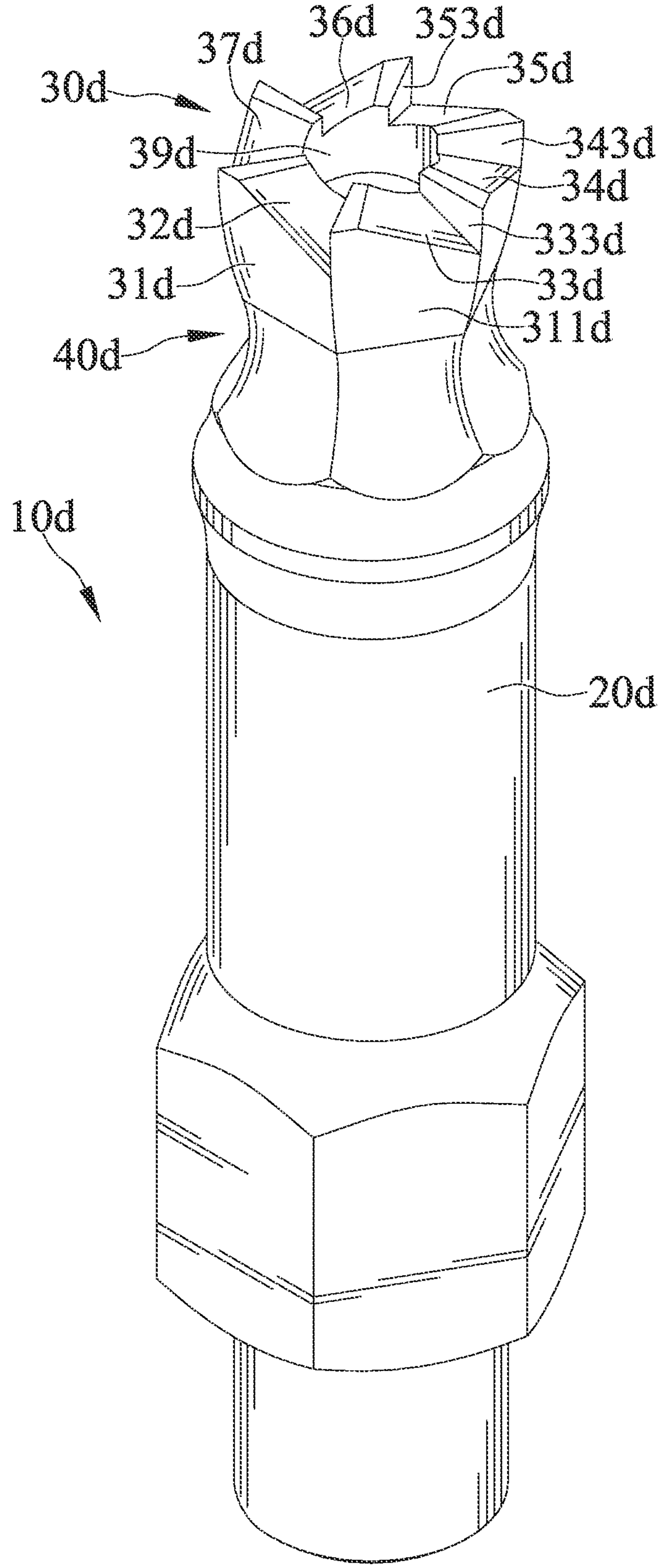
FIG. 16 is a perspective view of an anti-slip driving tool of a fifth embodiment according to the present invention.
Figure 17:
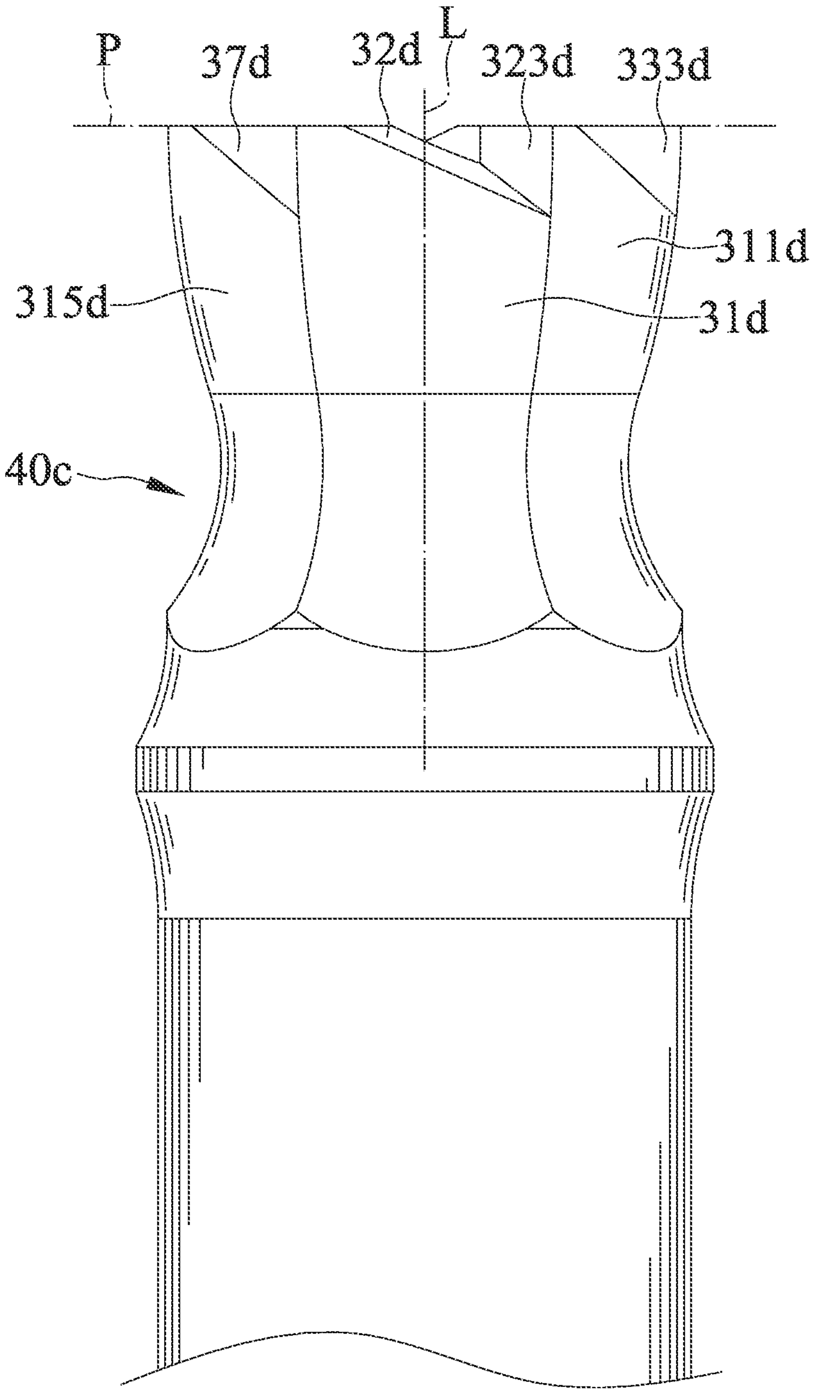
FIG. 17 is a partial, side elevational view of the anti-slip driving tool of FIG. 16.
Figure 18:
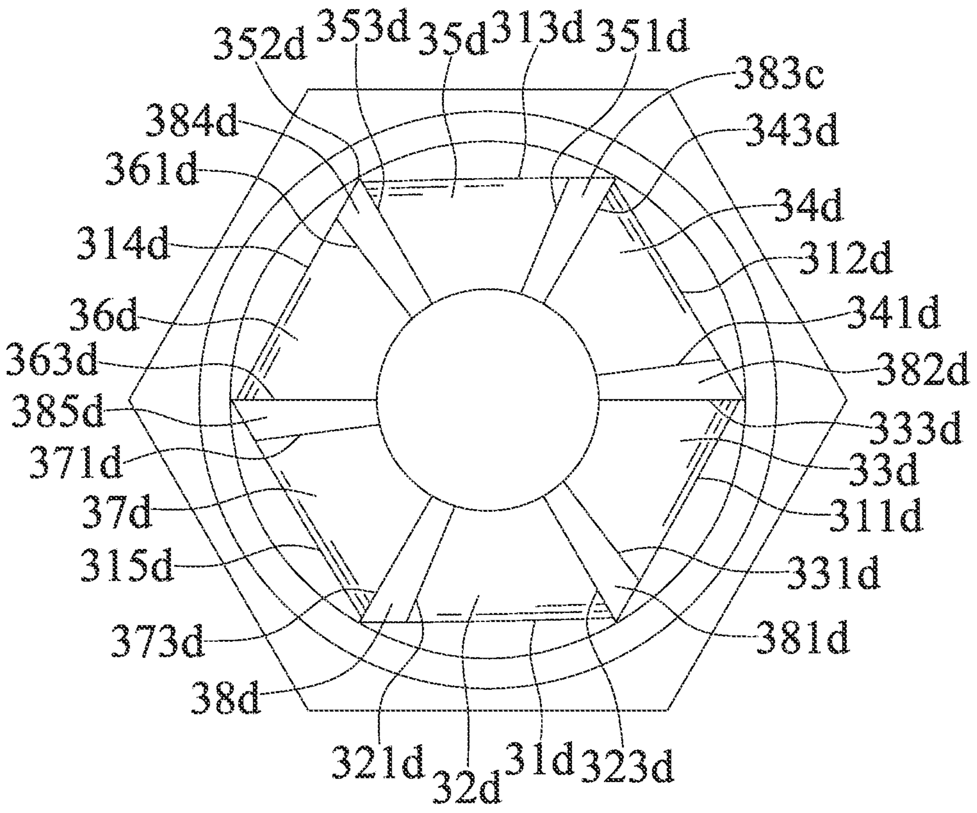
FIG. 18 is an end elevational view of the anti-slip driving tool of FIG. 16.

FIGS. 16-18 show an anti-slip driving tool 10*d* in accordance with a fifth embodiment of the present invention, and the same numbers are used to correlate similar components of the fourth embodiment, but bearing a letter d. The fifth embodiment is substantially the same as the fourth embodiment but is mainly different from the fourth embodiment by that the anti-slip driving tool 10*d* includes a body portion 20*d*, a driving portion 30*d*, and a neck portion 40*d* formed between the body portion 20*d* and the driving portion 30*d*.

The end of the driving portion 30*d* opposite to the neck portion 40*d* includes a hole 39*d* centered at the longitudinal axis L and extending along the longitudinal axis L, a side of the first end face 32*d* opposite to the first peripheral face 31*d* is connected to the hole 39*d*, and an end of the first side 321*d* adjacent to the longitudinal axis L and an end of the first driving face 323*d* adjacent to the longitudinal axis L are connected to the hole 39*d*.

A side of the second end face 33*d* opposite to the second peripheral face 311*d* is connected to the hole 39*d*. An end of the second side 331*d* adjacent to the longitudinal axis L and an end of the fourth driving face 333*d* adjacent to the longitudinal axis L are connected to the hole 39*d*. A side of the third end face 34*d* opposite to the third peripheral face 312*d* is connected to the hole 39*d*. An end of the third side 341*d* adjacent to the longitudinal axis L and an end of the second driving face 343*d* adjacent to the longitudinal axis L are connected to the hole 39*d*. A side of the fourth end face 35*d* opposite to the fourth peripheral face 313*d* is connected to the hole 39*d*. An end of the fourth side 351*d* adjacent to the longitudinal axis L and an end of the fifth driving face 353*d* adjacent to the longitudinal axis L are connected to the hole 39*d*. A side of the fifth end face 36*d* opposite to the fifth peripheral face 314*d* is connected to the hole 39*d*. An end of the fifth side 361*d* adjacent to the longitudinal axis L and an end of the third driving face 363*d* adjacent to the longitudinal axis L are connected to the hole. A side of the sixth end face 37*d* opposite to the sixth peripheral face 315*d* is connected to the hole 39*d*. An end of the sixth side 371*d* adjacent to the longitudinal axis L and an end of a sixth driving face 373*d* adjacent to the longitudinal axis L are connected to the hole 39*d*.

The end of the driving portion 30*d* opposite to the neck portion 40*d* includes a seventh end face 38*d*, an eighth end face 381*d*, a ninth end face 382*d*, a tenth end face 383*d*, an eleventh end face 384*d*, and a twelfth end face 385*d*. Each of the seventh, eighth, ninth, tenth, eleventh, and twelfth end faces 38*d*, 381*d*-385*d* is a planar face extending perpendicularly to the longitudinal axis L and is located on the reference plane P.

The seventh end face 38*d* is located on a side of the first end face 32*d* opposite to the first driving face 323*d*. An end of the seventh end face 38*d* is connected to the hole 39*d*. Another end of the seventh end face 38*d* is connected to the first peripheral face 31*d*. A side of the seventh end face 38*d* is connected to the first end face 32*d*. The first side 321*d* is formed between the first end face 32*d* and the seventh end face 38*d*. The eighth end face 381*d* is located on a side of the second end face 33*d* opposite to the fourth driving face 333*d*. An end of the eighth end face 381*d* is connected to the hole 39*d*. Another end of the eighth end face 381*d* is connected to the second peripheral face 311*d*. Aside of the eighth end face 381*d* is connected to the second end face 33*d*. The second side 331*d* is formed between the second end face 33*d* and the eighth end face 381*d*. The ninth end face 382*d* is located on a side of the third end face 34*d* opposite to the second driving face 343*d*. An end of the ninth end face 382*d* is connected to the hole 39*d*. Another end of the ninth end face 382*d* is connected to the third peripheral face 312*d*. A side of the ninth end face 382*d* is connected to the third end face 34*d*. The third side 341*d* is formed between the third end face 34*d* and the ninth end face 382*d*.

The tenth end face 383*d* is located on a side of the fourth end face 35*d* opposite to the fifth driving face 353*d*. An end of the tenth end face 383*d* is connected to the hole 39*d*. Another end of the tenth end face 383*d* is connected to the fourth peripheral face 313*d*. A side of the tenth end face 383*d* is connected to the fourth end face 35*d*. The fourth side 351*d* is formed between the fourth end face 35*d* and the tenth end face 383*d*. The eleventh end face 384*d* is located on a side of the fifth end face 36*d* opposite to the third driving face 363*d*. An end of the eleventh end face 384*d* is connected to the hole 39*d*. Another end of the eleventh end face 384*d* is connected to the fifth peripheral face 314*d*. A side of the eleventh end face 384*d* is connected to the fifth end face 36*d*. The fifth side 361*d* is formed between the fifth end face 36*d* and the eleventh end face 384*d*. The twelfth end face 385*d* is located on a side of the sixth end face 37*d* opposite to the sixth driving face 373*d*. A side of the twelfth end face 385*d* is connected to the sixth end face 37*d*. The sixth side 371*d* is formed between the sixth end face 37*d* and the twelfth end face 385*d*.

Figure 19:
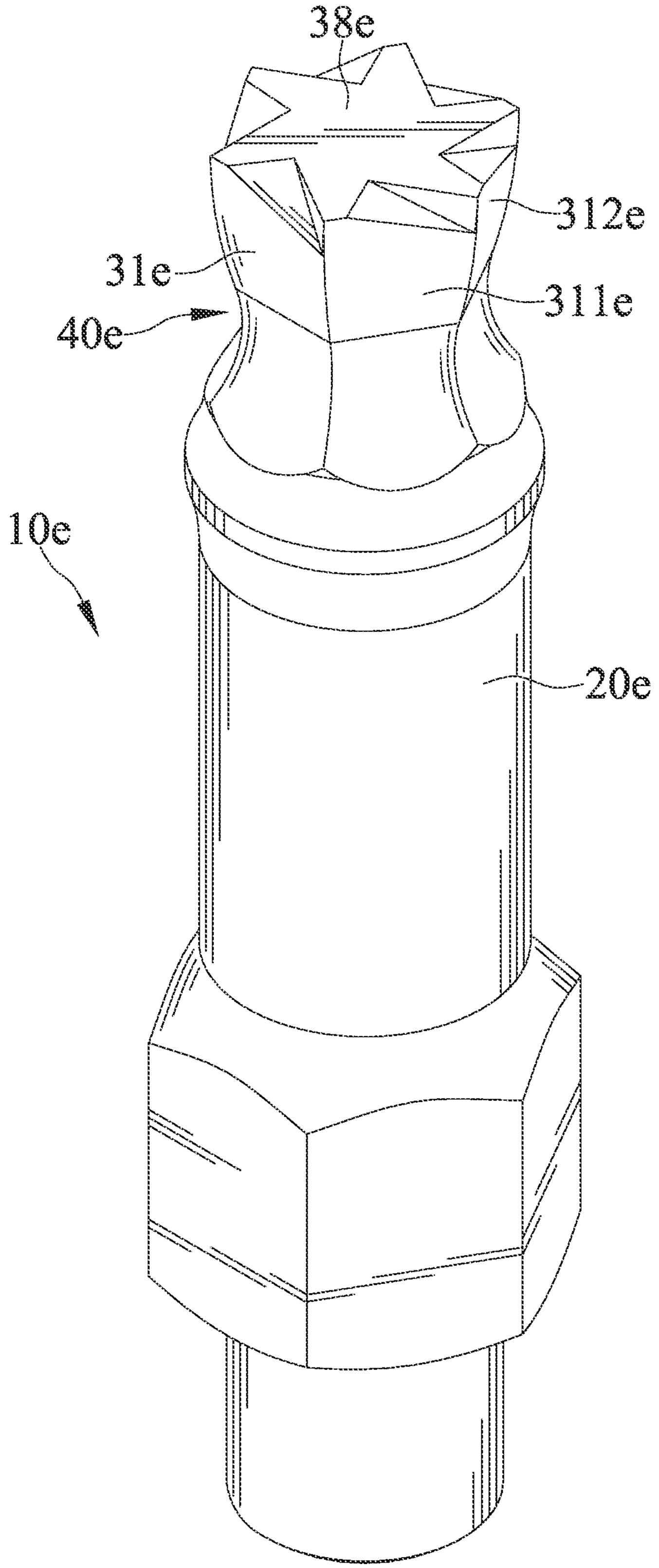
FIG. 19 is a perspective view of an anti-slip driving tool of a sixth embodiment according to the present invention.
Figure 20:
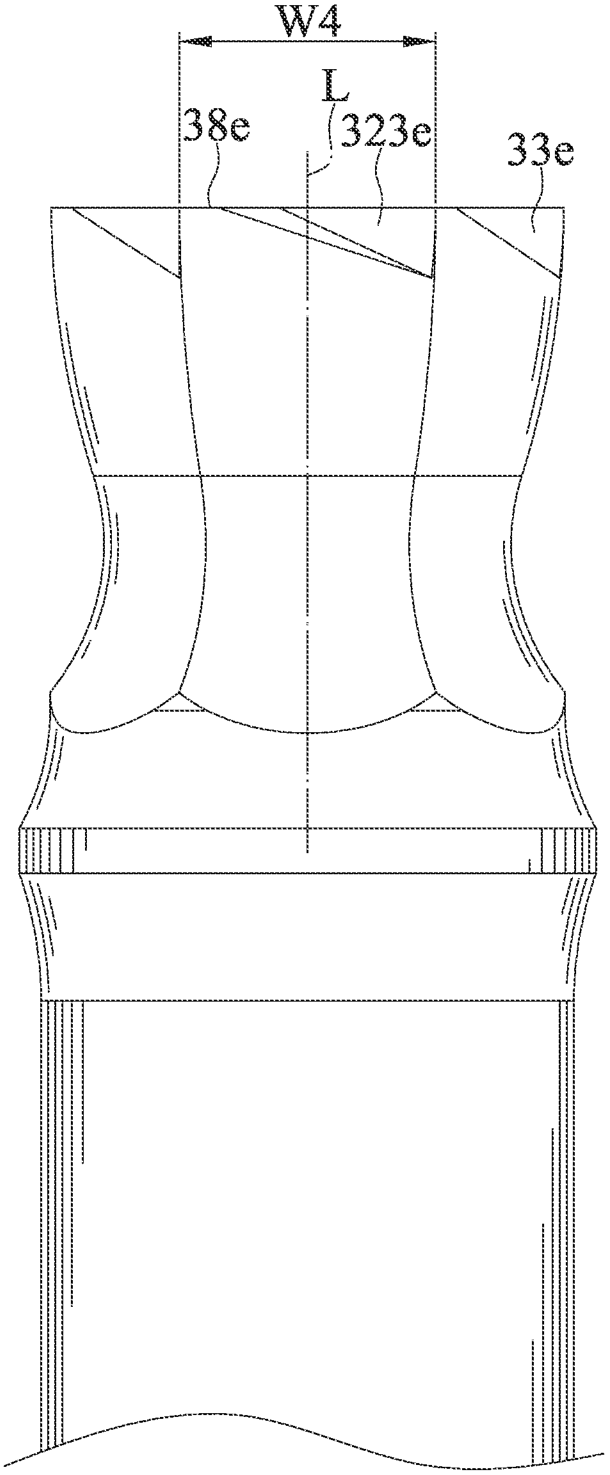
FIG. 20 is a partial, side elevational view of the anti-slip driving tool of FIG. 19.
Figure 21:
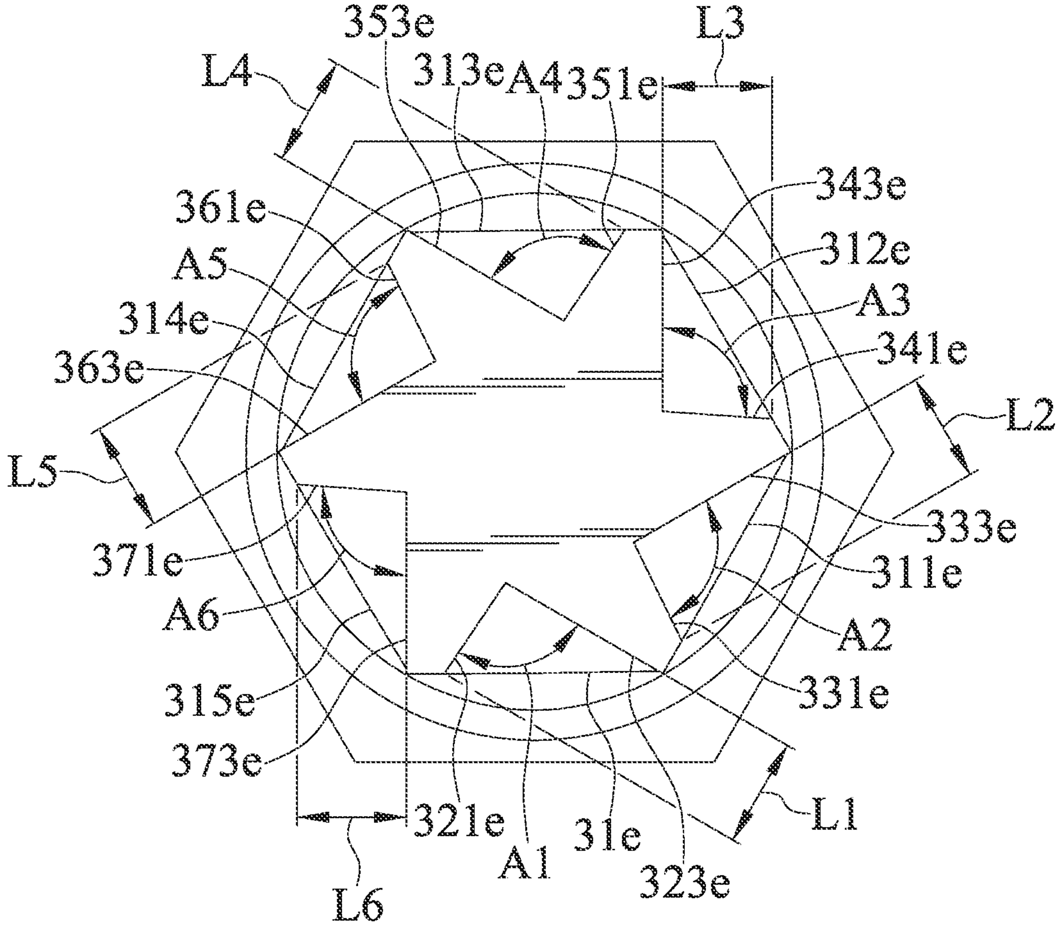
FIG. 21 is an end elevational view of the anti-slip driving tool of FIG. 19.

FIGS. 19-21 show an anti-slip driving tool 10*e* in accordance with a sixth embodiment of the present invention, and the same numbers are used to correlate similar components of the fourth embodiment, but bearing a letter e. The fifth embodiment is substantially the same as the fourth embodiment but is mainly different from the fourth embodiment by that the anti-slip driving tool 10*e* includes a body portion 20*e*, a driving portion 30*e*, and a neck portion 40*e* formed between the body portion 20*e* and the driving portion 30*e*.

The end of the driving portion 30*e* opposite to the neck portion 40*e* includes a second end face 33*e* connected to the second peripheral face 311*e*.

The first peripheral face 31*e* has a lateral width W4 in a radial direction perpendicular to the longitudinal axis L, an end of the first side 321*e* adjacent to the longitudinal axis L and another end of the first side 321*e* connected to the first peripheral face 31*e* have a first length L1 therebetween, an end of the second side 331*e* adjacent to the longitudinal axis L and another end of the second side 331*e* connected to the second peripheral face 311*e* have a second length L2 therebetween, an end of the third side 341*e* adjacent to the longitudinal axis L and another end of the third side 341*e* connected to the third peripheral face 312*e* have a third length L3 therebetween, an end of the fourth side 351*e* adjacent to the longitudinal axis L and another end of the fourth side 351*e* connected to the fourth peripheral face 313*e* have a fourth length L4 therebetween, an end of the fifth side 361*e* adjacent to the longitudinal axis L and another end of the fifth side 361*e* connected to the fifth peripheral face 314*e* have a fifth length L5 therebetween, an end of the sixth side 371*e* adjacent to the longitudinal axis L and another end of the sixth side 371*e* connected to the sixth peripheral face 315*e* have a sixth length L6 therebetween, and each of the first length L1, the second length L2, the third length L3, the fourth length L4, the fifth length L5, and the sixth length L6 is smaller than 0.5 times the lateral width W4.

Furthermore, the first driving face 323*e* connected to the seventh end face 38*e* intersects with the first side 321*e*. The side of the first driving face 323*e* and the first side 321*e* have a first angle A1 therebetween. A side of the fourth driving face 333*e* connected to the seventh end face 38*e* intersects with the second side 331*e*. The side of the fourth driving face 333*e* and the second side 331*e* have a second angle A2 therebetween. A side of the second driving face 343*e* connected to the seventh end face 38*e* intersects with the third side 341*c*. The side of the second driving face 343*e* and the third side 341*e* have a third angle A3 therebetween. A side of the fifth driving face 353*e* connected to the seventh end face 38*e* intersects with the fourth side 351*e*. The side of the fifth driving face 353*e* and the fourth side 351*e* have a fourth angle A4 therebetween. A side of the third driving face 363*e* connected to the seventh end face 38*e* intersects with the fifth side 361*e*. The side of the third driving face 363*e* and the fifth side 361*e* have a fifth angle A5 therebetween. A side of the sixth driving face 373*e* connected to the seventh end face 38*e* intersects with the sixth side 371*e*. The side of the sixth driving face 373*e* and the sixth side 371*e* have a sixth angle A6 therebetween. Each of the first angle A1, the second angle A2, the third angle A3, the fourth angle A4, the fifth angle A5, and the sixth angle A6 is larger than 80°.

Figure 22:
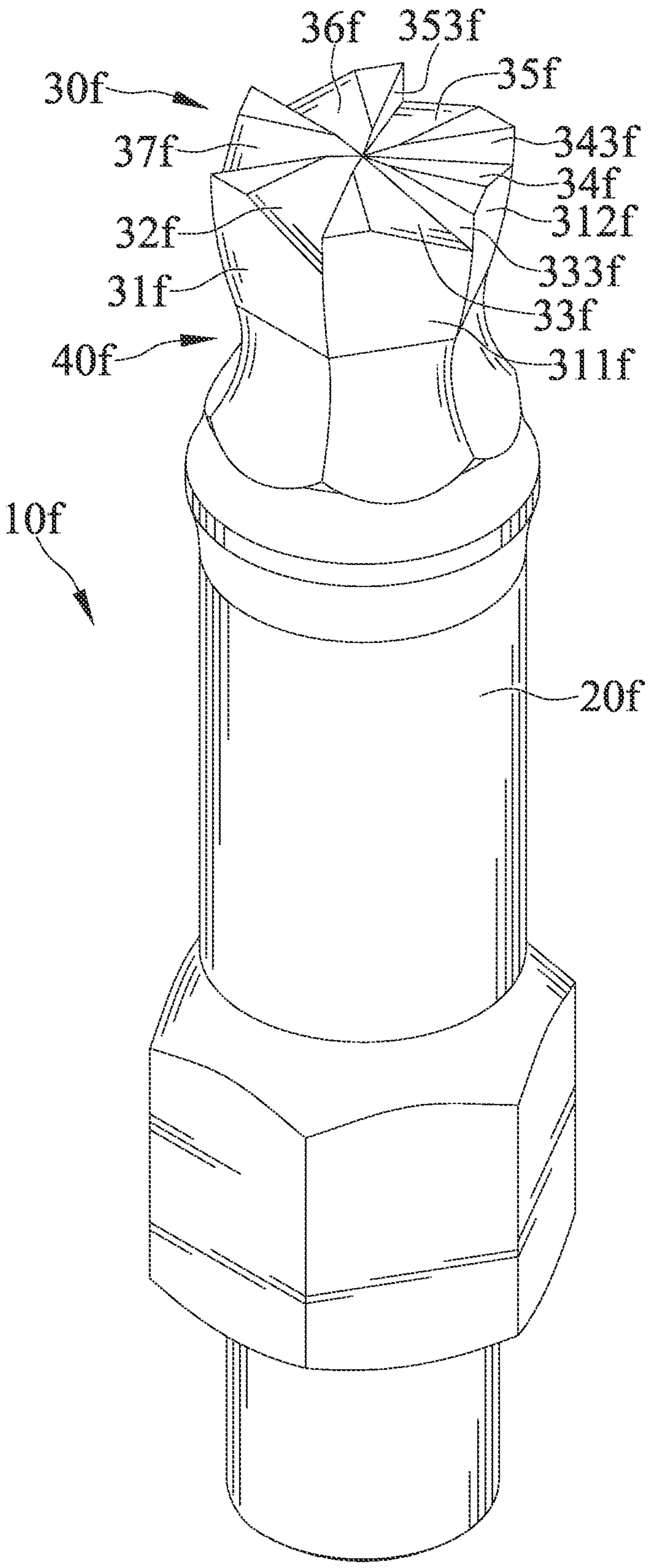
FIG. 22 is a perspective view of an anti-slip driving tool of a seventh embodiment according to the present invention.
Figure 23:
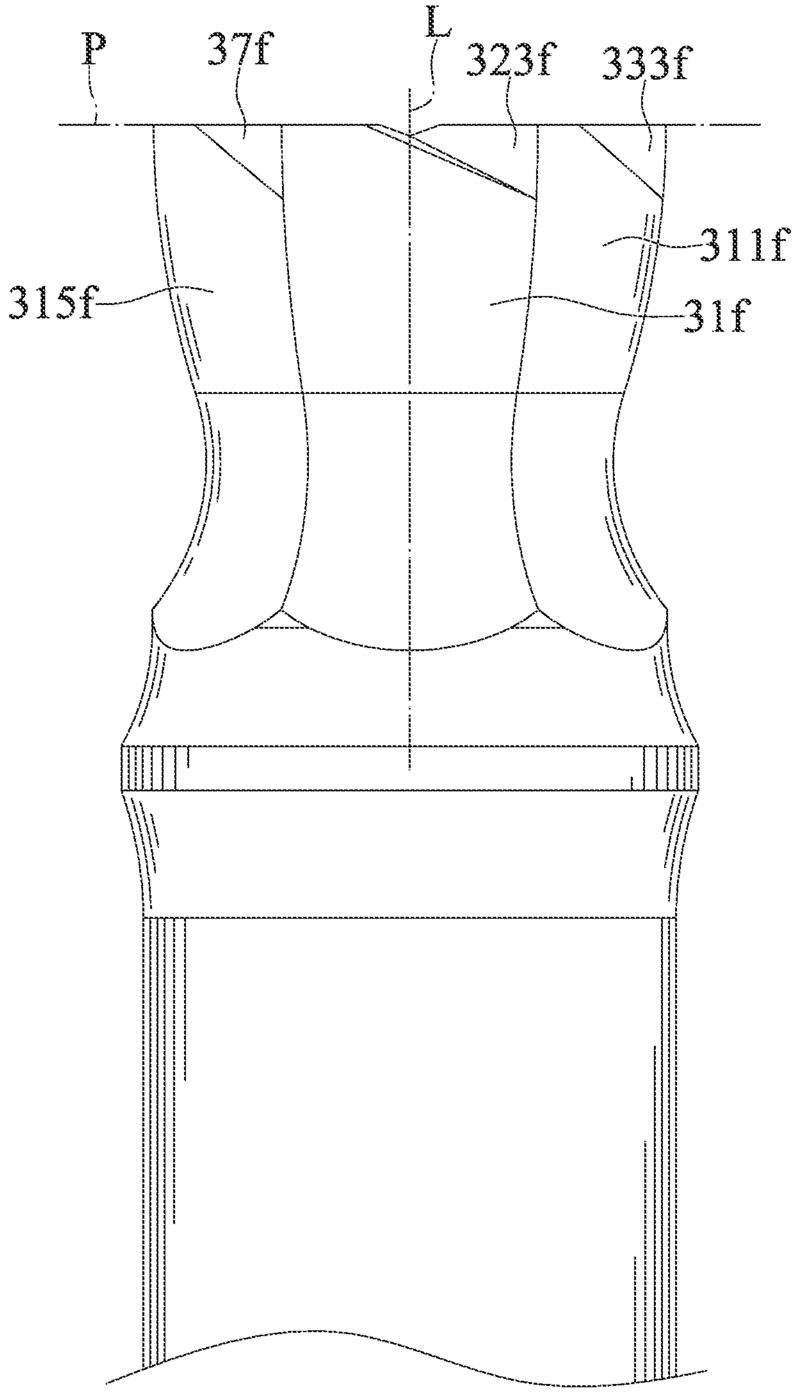
FIG. 23 is a partial, side elevational view of the anti-slip driving tool of FIG. 22.
Figure 24:
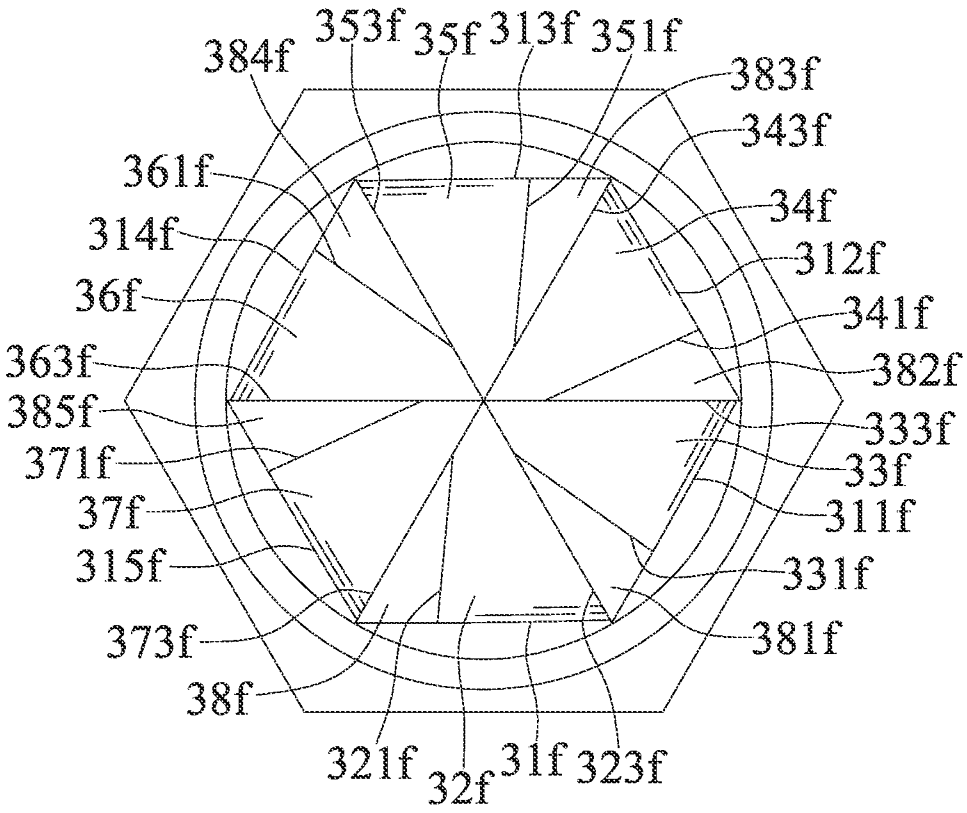
FIG. 24 is an end elevational view of the anti-slip driving tool of FIG. 22.

FIGS. 22-24 show an anti-slip driving tool 10*f* in accordance with a seventh embodiment of the present invention, and the same numbers are used to correlate similar components of the third embodiment, but bearing a letter f. The seventh embodiment is substantially the same as the third embodiment but is mainly different from the third embodiment by that the anti-slip driving tool 10*f* includes a body portion 20*f*, a driving portion 30*f*, and a neck portion 40*f* formed between the body portion 20*f* and the driving portion 30*f*.

An end of the first side 321*f* adjacent to the longitudinal axis L has an end point not located on the longitudinal axis L, an end of the second side 331*f* adjacent to the longitudinal axis L has an end point not located on the longitudinal axis L, an end of the third side 341*f* adjacent to the longitudinal axis L has an end point not located on the longitudinal axis L, an end of the fourth side 351*f* adjacent to the longitudinal axis L has an end point not located on the longitudinal axis L, an end of the fifth side 361*f* adjacent to the longitudinal axis L has an end point not located on the longitudinal axis L, and an end of the sixth side 371*f* adjacent to the longitudinal axis L has an end point not located on the longitudinal axis L.

Furthermore, the end of the first side 321*f* adjacent to the longitudinal axis L is connected to the sixth driving face 373*f*. The first driving face 323*f* does not intersect with the first side 321*f* The end of the second side 331*f* adjacent to the longitudinal axis L is connected to the first driving face 323*f*. The fourth driving face 333*f* does not intersect with the second side 331*f*. The end of the third side 341*f* adjacent to the longitudinal axis L is connected to the fourth driving face 333*f*. The second driving face 343*f* does not intersect with the third side 341*f*. The end of the fourth side 351*f* adjacent to the longitudinal axis L is connected to the second driving face 343*f*. The fifth driving face 353*f* does not intersect with the fourth side 351*f*. The end of the fifth side 361*f* adjacent to the longitudinal axis L is connected to the fifth driving face 353*f*. The third driving face 363*f* does not intersect with the fifth side 361*f*. The end of the sixth side 371*f* adjacent to the longitudinal axis L is connected to the third driving face 363*f*. The sixth driving face 373*f* does not intersect with the sixth side 371*f*.

The end of the driving portion 30*f* opposite to the neck portion 40*f* includes a seventh end face 38*f*, an eighth end face 381*f*; a ninth end face 382*f*, a tenth end face 383*f*, an eleventh end face 384*f*, and a twelfth end face 385*f*. Each of the seventh, eighth, ninth, tenth, eleventh, and twelfth end faces 38*f*, 381*f*-385*f* is a planar face extending perpendicularly to the longitudinal axis L and is located on the reference plane P.

The seventh end face 38*f* is connected to the first peripheral face 31 the first end face 32*f*, and the sixth driving face 373*f*. The first side 321*f* is formed between the first end face 32*f* and the seventh end face 38*f*. The eighth end face 381*f* is connected to the second peripheral face 311*f*, the second end face 33*f* and the first driving face 323*f*. The second side 331*f* is formed between the second end face 33*f* and the eighth end face 381*f* The ninth end face 382*f* is connected to the third peripheral face 312*f* the third end face 34*f*, and the fourth driving face 333*f*. The third side 341*f* is formed between the third end face 34*f* and the ninth end face 382*f*.

The tenth end face 383*f* is connected to the fourth peripheral face 313*f* the fourth end face 35*f* and the second driving face 343*f* The fourth side 351*f* is formed between the fourth end face 35*f* and the tenth end face 383*f*. The eleventh end face 384*f* is connected to the fifth peripheral face 314*f*, the fifth end face 36*f*, and the fifth driving face 353*f*. The fifth side 361*f* is formed between the fifth end face 36*f* and the eleventh end face 384*f*. The twelfth end face 385*f* is connected to the sixth peripheral face 315*f* the sixth end face 37*f*, and the third driving face 363. The sixth side 371*f* is formed between the sixth end face 37*f* and the twelfth end face 385*f*.

Figure 25:
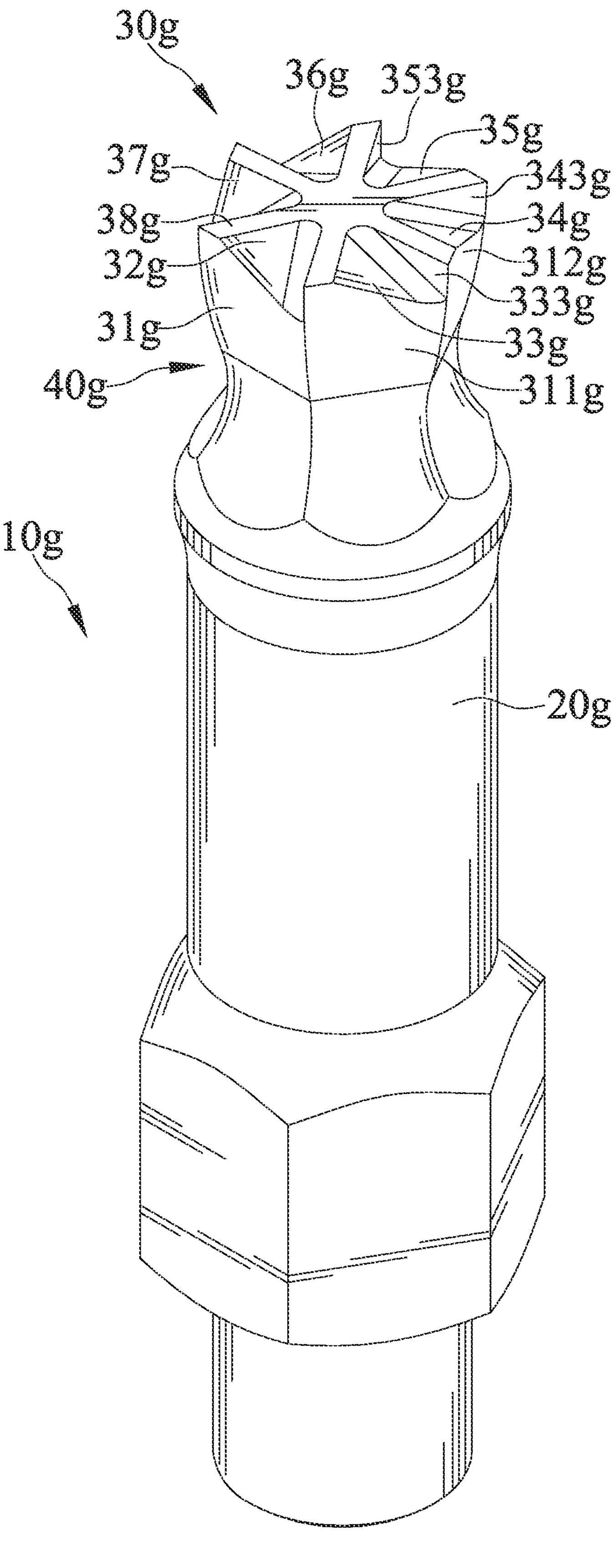
FIG. 25 is a perspective view of an anti-slip driving tool of a eighth embodiment according to the present invention.
Figure 26:
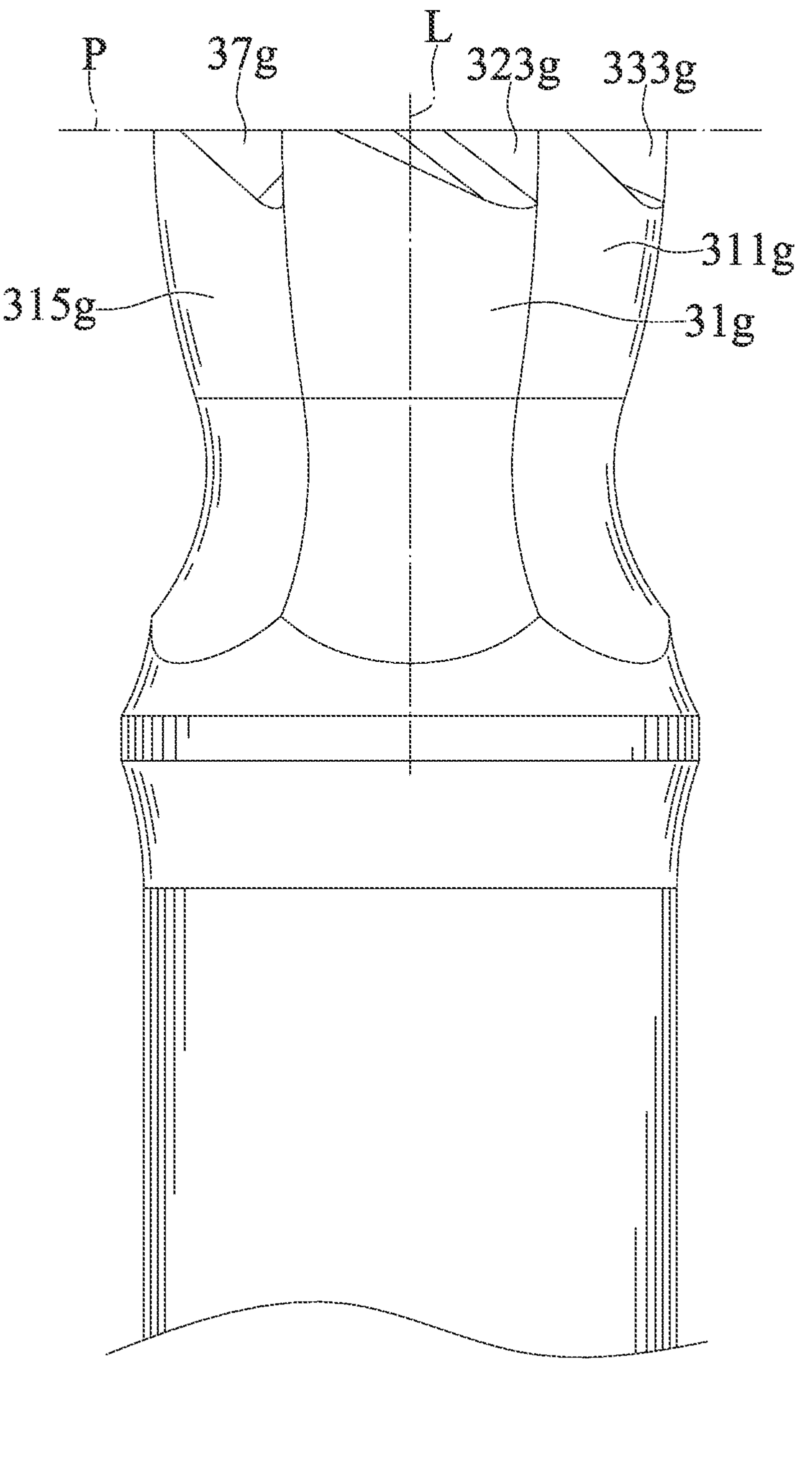
FIG. 26 is a partial, side elevational view of the anti-slip driving tool of FIG. 25.
Figure 27:
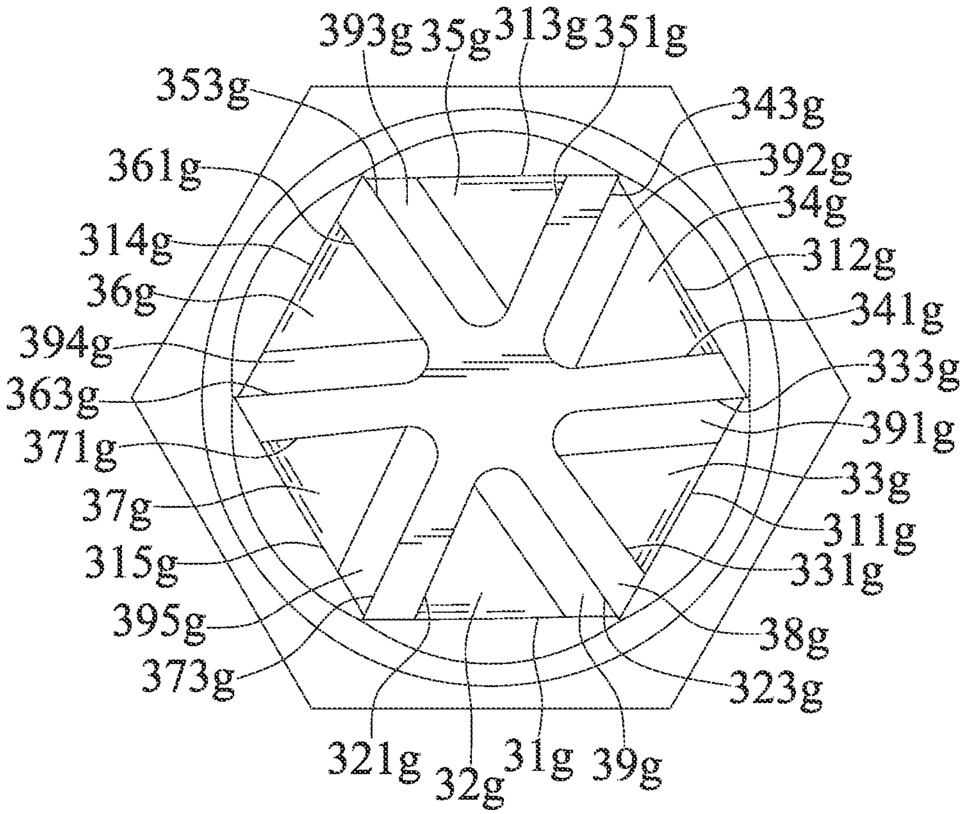
FIG. 27 is an end elevational view of the anti-slip driving tool of FIG. 25.

FIGS. 25-27 show an anti-slip driving tool 10*g* in accordance with a seventh embodiment of the present invention, and the same numbers are used to correlate similar components of the third embodiment, but bearing a letter g. The seventh embodiment is substantially the same as the third embodiment but is mainly different from the third embodiment by that the anti-slip driving tool 10*g* includes a body portion 20*g*, a driving portion 30*g*, and a neck portion 40*g* formed between the body portion 20*g* and the driving portion 30*g*.

An end of the first side 321*g* adjacent to the reference rotating axis L has an end point not located on the reference rotating axis L, an end of the second side 331*g* is adjacent to the reference rotating axis L and has an end point not located on the reference rotating axis L, an end of the third side 341*g* is adjacent to the reference rotating axis L and has an end point not located on the reference rotating axis L, an end of the fourth side 351*g* is adjacent to the reference rotating axis L and has an end point not located on the reference rotating axis L, an end of the fifth side 361*g* is adjacent to the reference rotating axis L and has an end point not located on the reference rotating axis L, and an end of the sixth side 371*g* is adjacent to the reference rotating axis L and has an end point not located on the reference rotating axis L.

The first driving face 323*g* does not intersect with the reference rotating axis L. The second driving face 343*g* does not intersect with the reference rotating axis L. The third driving face 363*g* does not intersect with the reference rotating axis L. The fourth driving face 333*g* does not intersect with the reference rotating axis L. The fifth driving face 353*g* does not intersect with the reference rotating axis L. The sixth driving face 373*g* does not intersect with the reference rotating axis L.

The second end face 33*g* is located on a side of the first driving face 323*g* opposite to the first end face 32*g* and is not connected to the first driving face 323*g*. The second side 331*g* is located on a side of the second end face 33*g* adjacent to the first driving face 323*g*. The fourth end face 35*g* is located on a side of the second driving face 343*g* opposite to the third end face 34*g* and does not intersect with the second driving face 343*g*. The fourth side 351*g* is located on a side of the fourth end face 35*g* adjacent to the second driving face 343*g*. The sixth end face 37*g* is located on a side of the third driving face 363*g* opposite to the fifth end face 36*g* and does not intersect with the third driving face 363*g*. The sixth side 371*g* is located on a side of the sixth end face 37*g* adjacent to the third driving face 363*g*. The third end face 34*g* is located on a side of the fourth driving face 333*g* opposite to the first end face 32*g* and does not intersect with the fourth driving face 333*g*. The third side 341*g* is located on a side of the third end face 34*g* adjacent to the fourth driving face 333*g*. The fifth end face 36*g* is located on a side of the fifth driving face 353*g* opposite to the fourth end face 35*g* and does not intersect with the fifth driving face 353*g*. The fifth side 361*g* is located on a side of the fifth end face 36*g* adjacent to the fifth driving face 353*g*. The first end face 32*g* is located on a side of the sixth driving face 373*g* opposite to the sixth end face 37*g* and does not intersect with the sixth driving face 373*g*. The first side 321*g* is located on a side of the first end face 32*g* adjacent to the sixth driving face 373*g*.

The end of the driving portion 30*g* opposite to the neck portion 40*g* includes a seventh end face 38*g*. The seventh end face 38*g* is a planar face extending perpendicularly to the reference rotating axis L and is located on the reference plane P. The seventh end face 38*g* is connected to the first end face 32*g*, the first driving face 323*g*, the second end face 33*g*, the second driving face 343*g*, the third end face 34*g*, the third driving face 363*g*, the fourth end face 35*g*, the fourth driving face 333*g*, the fifth end face 36*g*, the fifth driving face 353*g*, the sixth end face 37*g*, and the sixth driving face 373*g*. An outer periphery of the seventh end face 38*g* surrounding the reference rotating axis L is connected to the first peripheral face 31*g*, the second peripheral face 311*g*, the third peripheral face 312*g*, the fourth peripheral face 313*g*, the fifth peripheral face 314*g*, and the sixth peripheral face 315*g*.

Furthermore, a first slant recess 39*g* is formed between the first end face 32*g* and the first driving face 323*g* and extends from the seventh end face 38*g* to the first peripheral face 31*g*. A second slant recess 391*g* is formed between the second end face 33*g* and the fourth driving face 333*g* and extends from the seventh end face 38*g* to the second peripheral face 311*g*. A third slant recess 392*g* is formed between the third end face 34*g* and the second driving face 343*g* and extends from the seventh end face 38*g* to the third peripheral face 312*g*. A fourth slant recess 393*g* is formed between the fourth end face 35*g* and the fifth driving face 353*g* and extends from the seventh end face 38*g* to the fourth peripheral face 313*g*. A fifth slant recess 394*g* is formed between the fifth end face 36*g* and the third driving face 363*g* and extends from the seventh end face 38*g* to the fifth peripheral face 314*g*. A sixth slant recess 395*g* is formed between the sixth end face 37*g* and the sixth driving face 373*g* and extends from the seventh end face 38*g* to the sixth peripheral face 315*g*.

Although specific embodiments have been illustrated and described, numerous modifications and variations are still possible without departing from the scope of the invention. The scope of the invention is limited by the accompanying claims.

The invention claimed is:

1. A driving tool comprising:

a body portion;

a driving portion defining a reference rotating axis, wherein a distal end of the driving portion opposite to the body portion is provided with a front driving face having a first width in a radial direction of the reference rotating axis; and a neck portion formed between the body portion and the driving portion and having a second width in the radial direction of the reference rotating axis, and wherein the second width is less than the first width;

wherein the front driving face is a plane perpendicular to the reference rotating axis;

wherein an outer periphery of the driving portion in the radial direction of the reference rotating axis is provided with a first peripheral face, wherein an end of the driving portion opposite to the body portion defines a reference plane and a first rear bevel face, wherein the reference plane is perpendicular to the reference rotating axis, wherein the front driving face is located in the reference plane, wherein a side of the first rear bevel face is connected to the front driving face and forms a first side, wherein an end of the first side is adjacent to the reference rotating axis, and another end of the first side opposite to the reference rotating axis is connected to the first peripheral face, and wherein the first rear bevel face is provided with a first corner not located on the first side and disposed between the reference plane and the body portion;

wherein the first rear bevel face is connected to a first driving face extending in a direction parallel to the reference rotating axis, wherein the first driving face is connected to the first corner, and wherein a side of the first driving face opposite to the first rear bevel face is connected to the front driving face;

wherein the body portion has a third width in the radial direction of the reference rotating axis, and wherein the second width is less than the third width;

wherein the outer periphery of the driving portion in the radial direction of the reference rotating axis is further provided with a second peripheral face, a third peripheral face, a fourth peripheral face, a fifth peripheral face, and a sixth peripheral face, wherein the first peripheral face and the fourth peripheral face are respectively disposed at two opposite sides of the driving portion, wherein the second peripheral face and the fifth peripheral face are respectively disposed at two opposite sides of the driving portion, wherein the third peripheral face and the sixth peripheral face are respectively disposed at two opposite sides of the driving portion;

wherein the end of the driving portion opposite to the body portion is further provided with a second rear bevel face, a third rear bevel face, a fourth rear bevel face, a fifth rear bevel face, and a sixth rear bevel face;

wherein a side of the second rear bevel face is connected to the front driving face and forms a second side, wherein an end of the second side is adjacent to the reference rotating axis, and another end of the second side opposite to the reference rotating axis is connected to the second peripheral face, wherein the second rear bevel face is provided with a second corner not located on the second side and disposed between the reference plane and the body portion, wherein the second rear bevel face is connected to a second driving face extending in a direction parallel to the reference rotating axis, wherein the second driving face is connected to the second corner, and wherein a side of the second driving face opposite to the second rear bevel face is connected to the front driving face;

wherein a side of the third rear bevel face is connected to the front driving face and forms a third side, wherein an end of the third side is adjacent to the reference rotating axis, and another end of the third side opposite to the reference rotating axis is connected to the third peripheral face, wherein the third rear bevel face is provided with a third corner not located on the third side and disposed between the reference plane and the body portion, wherein the third rear bevel face is connected to a third driving face extending in a direction parallel to the reference rotating axis, wherein the third driving face is connected to the third corner, and wherein a side of the third driving face opposite to the third rear bevel face is connected to the front driving face;

wherein a side of the fourth rear bevel face is connected to the front driving face and forms a fourth side, wherein an end of the fourth side is adjacent to the reference rotating axis, and another end of the fourth side opposite to the reference rotating axis is connected to the fourth peripheral face, wherein the fourth rear bevel face is provided with a fourth corner not located on the fourth side and disposed between the reference plane and the body portion, wherein the fourth rear bevel face is connected to a fourth driving face extending in a direction parallel to the reference rotating axis, wherein the fourth driving face is connected to the fourth corner, and wherein a side of the fourth driving face opposite to the fourth rear bevel face is connected to the front driving face;

wherein a side of the fifth rear bevel face is connected to the front driving face and forms a fifth side, wherein an end of the fifth side is adjacent to the reference rotating axis, and another end of the fifth side opposite to the reference rotating axis is connected to the fifth peripheral face, wherein the fifth rear bevel face is provided with a fifth corner not located on the fifth side and disposed between the reference plane and the body portion, wherein the fifth rear bevel face is connected to a fifth driving face extending in a direction parallel to the reference rotating axis, wherein the fifth driving face is connected to the fifth corner, and wherein a side of the fifth driving face opposite to the fifth rear bevel face is connected to the front driving face;

wherein a side of the sixth rear bevel face is connected to the front driving face and forms a sixth side, wherein an end of the sixth side is adjacent to the reference rotating axis, and another end of the sixth side opposite to the reference rotating axis is connected to the sixth peripheral face, wherein the sixth rear bevel face is provided with a sixth corner not located on the sixth side and disposed between the reference plane and the body portion, wherein the sixth rear bevel face is connected to a sixth driving face extending in a direction parallel to the reference rotating axis, wherein the sixth driving face is connected to the sixth corner, and wherein a side of the sixth driving face opposite to the sixth rear bevel face is connected to the front driving face;

wherein a width between the first peripheral face and the fourth peripheral face in the radial direction of the reference rotating axis is tapered from an end adjacent to the front driving face to another end adjacent to the neck portion, wherein a width between the second peripheral face and the fifth peripheral face in the radial direction of the reference rotating axis is tapered from an end adjacent to the front driving face to another end adjacent to the neck portion, and wherein a width between the third peripheral face and the sixth peripheral face in the radial direction of the reference rotating axis is tapered from an end adjacent to the front driving face to another end adjacent to the neck portion, wherein the outer periphery of the driving portion in the radial direction of the reference rotating axis is further provided with a seventh peripheral face, an eighth peripheral face, a ninth peripheral face, a tenth peripheral face, an eleventh peripheral face, and a twelfth peripheral face, wherein the seventh peripheral face is disposed between the first peripheral face and the second peripheral face and is connected to the first corner, wherein the eighth peripheral face is disposed between the second peripheral face and the third peripheral face and is connected to the second corner, wherein the ninth peripheral face is disposed between the third peripheral face and the fourth peripheral face and is connected to the third corner, wherein the tenth peripheral face is disposed between the fourth peripheral face and the fifth peripheral face and is connected to the fourth corner, wherein the seventh peripheral face and the tenth peripheral face are respectively disposed at two opposite sides of the driving portion, wherein the eleventh peripheral face is disposed between the fifth peripheral face and the sixth peripheral face and is connected to the fifth corner, wherein the eighth peripheral face and the eleventh peripheral face are respectively disposed at two opposite sides of the driving portion, wherein the twelfth peripheral face is disposed between the sixth peripheral face and the first peripheral face and is connected to the sixth corner, wherein the ninth peripheral face and the twelfth peripheral face are respectively disposed at two opposite sides of the driving portion;

wherein a width between the first peripheral face and the fourth peripheral face in the radial direction of the reference rotating axis is equal to a width between the second peripheral face and the fifth peripheral face in the radial direction of the reference rotating axis, and is equal to a width between the third peripheral face and the sixth peripheral face in the radial direction of the reference rotating axis;

wherein a width between the seventh peripheral face and the tenth peripheral face in the radial direction of the reference rotating axis is equal to a width between the eighth peripheral face and the eleventh peripheral face in the radial direction of the reference rotating axis, and is equal to a width between the ninth peripheral face and the twelfth peripheral face in the radial direction of the reference rotating axis; and wherein the width between the first peripheral face and the fourth peripheral face in the radial direction of the reference rotating axis is less than the width between the seventh peripheral face and the tenth peripheral face in the radial direction of the reference rotating axis.

2. The driving tool as claimed in claim 1, wherein an outer periphery of the neck portion in the radial direction of the reference rotating axis is provided with a first neck surface, a second neck surface, a third neck surface, a fourth neck surface, a fifth neck surface, and a sixth neck surface, wherein each of the first, second, third, fourth, fifth and sixth neck surfaces is a concave surface, wherein an end of the first neck surface is connected to the seventh peripheral face, and another end of the first neck surface is connected to the body portion, wherein an end of the second neck surface is connected to the eighth peripheral face, and another end of the second neck surface is connected to the body portion, wherein an end of the third neck surface is connected to the ninth peripheral face, and another end of the third neck surface is connected to the body portion, wherein an end of the fourth neck surface is connected to the tenth peripheral face, and another end of the fourth neck surface is connected to the body portion, wherein an end of the fifth neck surface is connected to the eleventh peripheral face, and another end of the fifth neck surface is connected to the body portion, and wherein an end of the sixth neck surface is connected to the twelfth peripheral face, and another end of the sixth neck surface is connected to the body portion.

* * * * *